United States Patent
Hodgkins et al.

(10) Patent No.: US 12,434,975 B2
(45) Date of Patent: *Oct. 7, 2025

(54) METHOD FOR MANUFACTURE OF PURE SILICA ZEOLITES IN THE PRESENCE OF ODSO

(71) Applicant: Saudi Arabian Oil Company, Dhahran (SA)

(72) Inventors: Robert Peter Hodgkins, Dhahran (SA); Omer Refa Koseoglu, Dhahran (SA); Javier Ruiz Martinez, Thuwal (SA); Moussa Zaarour, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 308 days.

This patent is subject to a terminal disclaimer.

(21) Appl. No.: 18/153,015

(22) Filed: Jan. 11, 2023

(65) Prior Publication Data
US 2024/0246829 A1    Jul. 25, 2024

(51) Int. Cl.
C01B 39/36    (2006.01)
C01B 39/04    (2006.01)
C01B 39/50    (2006.01)

(52) U.S. Cl.
CPC .............. *C01B 39/36* (2013.01); *C01B 39/04* (2013.01); *C01B 39/50* (2013.01)

(58) Field of Classification Search
CPC ....... C01B 33/18; C01B 33/181; C01B 39/04; C01F 7/14
USPC .......................................................... 423/702
See application file for complete search history.

(56) References Cited

U.S. PATENT DOCUMENTS

| | | |
|---|---|---|
| 3,313,594 A | 4/1967 | Wilson |
| 3,516,786 A | 6/1970 | Maher et al. |
| 3,556,725 A | 1/1971 | Chiola et al. |
| 4,061,724 A * | 12/1977 | Grose ............... C01B 37/02 423/DIG. 22 |
| 5,763,720 A | 6/1998 | Buchanan et al. |
| 5,951,962 A | 9/1999 | Müller et al. |
| 6,337,063 B1 | 1/2002 | Rouleau et al. |
| 7,238,337 B2 | 7/2007 | Chen |
| 7,923,522 B2 | 4/2011 | Hamada et al. |
| 9,624,110 B2 | 4/2017 | Jiang et al. |

(Continued)

FOREIGN PATENT DOCUMENTS

| | | |
|---|---|---|
| CN | 102442677 A | 5/2012 |
| CN | 102452663 A | 5/2012 |

(Continued)

OTHER PUBLICATIONS

Iwakai, et.al., "Preparation of nano-crystalline MFI zeolite via hydrothermal synthesis in water/surfactant/organic solvent using fumed silica as the Si source", Microporous and Mesoporous Materials 141 (2011) 167-174; (Year: 2011).*

(Continued)

*Primary Examiner* — Sally A Merkling
(74) *Attorney, Agent, or Firm* — Leason Ellis LLP

(57) ABSTRACT

The present disclosure is directed to a method to synthesize pure silica zeolites. This is accomplished by using an improved sol-gel formulation including a water-soluble fraction of ODSO as an additional component together with precursors and reagents effective for synthesis of pure silica zeolite.

20 Claims, 5 Drawing Sheets

(56) References Cited

U.S. PATENT DOCUMENTS

| | | | |
|---|---|---|---|
| 9,656,251 B2 | 5/2017 | Shu et al. | |
| 10,781,168 B2 | 9/2020 | Koseoglu et al. | |
| 10,793,782 B2 | 10/2020 | Koseoglu et al. | |
| 10,807,947 B2 | 10/2020 | Koseoglu et al. | |
| 10,927,318 B2 | 2/2021 | Koseoglu et al. | |
| 11,111,212 B2 | 9/2021 | Koseoglu et al. | |
| 11,124,713 B2 | 9/2021 | Koseoglu et al. | |
| 11,970,403 B2 * | 4/2024 | Hodgkins | C01B 39/48 |
| 2017/0001872 A1 | 1/2017 | Schmidt et al. | |
| 2020/0181506 A1 * | 6/2020 | Koseoglu | C10G 21/22 |

FOREIGN PATENT DOCUMENTS

| | | |
|---|---|---|
| CN | 103055933 A | 4/2013 |
| CN | 104556103 A | 4/2015 |
| CN | 106145134 A | 11/2016 |
| CN | 107840346 A | 3/2018 |
| CN | 107982540 A | 5/2018 |
| CN | 109569701 A | 4/2019 |
| CN | 112174162 A | 1/2021 |
| EP | 123060 A1 | 10/1984 |
| EP | 0999183 B1 | 6/2003 |
| GB | 1592809 A | 7/1981 |
| JP | 2009114007 A | 5/2009 |
| WO | 2018202468 A1 | 11/2018 |
| WO | 2022133279 A1 | 6/2022 |

OTHER PUBLICATIONS

Grabicka et al. "Microwave-assisted synthesis of periodic mesoporous organosilicas with ethane and disulfide groups." Microporous and mesoporous materials 119.1-3 (2009): 144-149.

Jin et al. "Gold nanoparticles stabilized in a novel periodic mesoporous organosilica of SBA-15 for styrene epoxidation." Microporous and mesoporous materials 111.1-3 (2008): 569-576.

Jo et al. "Synthesis of Silicate Zeolite Analogues Using Organic Sulfonium Compounds as Structure-Directing Agents." Angewandte Chemie International Edition 54.43 (2015). Wiley Online Library, 12996-12999. 14 total pages.

Wragg et al. "Pure silica zeolite-type frameworks: a structural analysis." Chemistry of Materials 20.4 (2008): 1561-1570.

Wu et al. "Sustainable synthesis of pure silica zeolites from a combined strategy of zeolite seeding and alcohol filling (and Supporting Information)." Angewandte Chemie 131.35 (2019): 12266-12270. (47 total pages.).

Feng, et al., "Direct Synthesis of ZSM-5 and Mordenite Using Poly(ethylene glycol) as a Structure-Directing Agent", Journal of Porous Materials, Oct. 2003, pp. 235-242.

* cited by examiner

METHOD FOR MANUFACTURE OF PURE SILICA ZEOLITES IN THE PRESENCE OF ODSO

FIELD OF THE DISCLOSURE

The present disclosure relates to methods of synthesizing pure silica zeolites.

BACKGROUND OF THE DISCLOSURE

Zeolites

Zeolites and related crystalline solids (also known as "zeotypes") are microporous crystalline solids possessing well-defined structures and uniform pore sizes that can be measured in angstroms (Å). Typically, zeolites comprise framework atoms such as silicon, aluminum and oxygen arranged as silica and alumina tetrahedra. The unique properties of zeolites and the ability to tailor zeolites for specific applications has resulted in the extensive use of zeolites in industry as catalysts, molecular sieves, adsorbents, ion exchange materials and for the separation of gases. Certain types of zeolites find application in various processes in petroleum refineries and many other applications. The zeolite pores can form sites for catalytic reactions, and can also form channels that are selective for the passage of certain compounds and/or isomers to the exclusion of others.

A class of zeolites includes pure silica zeolites (PSZs), which are typically synthesized via hydrothermal means from which crystals precipitate from a gel using water as a solvent. A PSZ is composed of $SiO_4$ tetrahedra. There is a rich variety as to how these tetrahedra link together to form the many different possible framework structures. The manner in which connectivity of tetrahedra varies and how this affects the Si—O bonds, Si—O—Si and O—Si—O angles, and their value ranges, are of great interest.

PSZs are interesting materials because they are highly thermally stable, structurally diverse, chemically simple (silica polymorphs), and closely related to catalytically-effective materials. Many of these have been well-characterized by single-crystal and powder diffraction techniques. For instance, a detailed list of PSZs is given in the review paper by David S. Wragg, Russell E. Morris, and Allen W. Burton, Pure Silica Zeolite-type Frameworks: A Structural Analysis, Chem. Mater. 2008, 20, 1561-1570; this publication provides information on their currently available structural data, and is incorporated by reference herein in its entirety.

ODSO

Within a typical refinery, there are by-product streams that must be treated or otherwise disposed of. The mercaptan oxidation process, commonly referred to as the MEROX process, has long been employed for the removal of the generally foul smelling mercaptans found in many hydrocarbon streams and was introduced in the refining industry over fifty years ago. Because of regulatory requirements for the reduction of the sulfur content of fuels for environmental reasons, refineries have been, and continue to be faced with the disposal of large volumes of sulfur-containing by-products. Disulfide oil (DSO) compounds are produced as a by-product of the MEROX process, in which the mercaptans are removed from any of a variety of petroleum streams including liquefied petroleum gas, naphtha, and other hydrocarbon fractions. It is commonly referred to as a 'sweetening process' because it removes the sour or foul smelling mercaptans present in crude petroleum. The term "DSO" is used for convenience in this description and in the claims, and will be understood to include the mixture of disulfide oils produced as by-products of the mercaptan oxidation process. Examples of DSO include dimethyldisulfide, diethyldisulfide, and methylethyldisulfide.

The by-product DSO compounds produced by the MEROX unit can be processed and/or disposed of during the operation of various other refinery units. For example, DSO can be added to the fuel oil pool at the expense of a resulting higher sulfur content of the pool. DSO can be processed in a hydrotreating/hydrocracking unit at the expense of higher hydrogen consumption. DSO also has an unpleasant foul or sour smell, which is somewhat less prevalent because of its relatively lower vapor pressure at ambient temperature; however, problems exist in the handling of this oil.

Commonly owned U.S. Pat. No. 10,807,947 which is incorporated by reference herein in its entirety discloses a controlled catalytic oxidation of MEROX process by-products DSO. The resulting oxidized material is referred to as oxidized disulfide oil (ODSO). As disclosed in 10,807,947, the by-product DSO compounds from the mercaptan oxidation process can be oxidized, preferably in the presence of a catalyst. The oxidation reaction products constitute an abundant source of ODSO compounds, sulfoxides, sulfonates, sulfinates and sulfones.

The ODSO stream so-produced contains ODSO compounds as disclosed in U.S. Pat. Nos. 10,781,168 and 11,111,212 as compositions (such as a solvent), in U.S. Pat. No. 10,793,782 as an aromatics extraction solvent, and in U.S. Pat. No. 10,927,318 as a lubricity additive, all of which are incorporated by reference herein in their entireties. In the event that a refiner has produced or has on hand an amount of DSO compounds that is in excess of foreseeable needs for these or other uses, the refiner may wish to dispose of the DSO compounds in order to clear a storage vessel and/or eliminate the product from inventory for tax reasons.

Thus, there is a clear and long-standing need to provide an efficient and economical process for the treatment of the large volumes of DSO by-products and their derivatives to effect and modify their properties in order to facilitate and simplify their environmentally acceptable disposal, and to utilize the modified products in an economically and environmentally friendly manner, and thereby enhance the value of this class of by-products to the refiner.

Despite the known ways to produce PSZs, there remains a need in the art for improved methods to produce PSZs, in particular using DSO by-products in an economically and environmentally friendly manner. It is in regard to these and other problems in the art that the present disclosure is directed to provide a technical solution for an effective method of increasing the efficiency of PSZ production.

SUMMARY OF THE DISCLOSURE

A method for synthesis of pure silica zeolite is provided. The method comprises: forming a homogeneous aqueous mixture of an effective amount of water-soluble oxidized disulfide oil (ODSO), and precursors and reagents effective for synthesis of pure silica zeolite; and heating the homogeneous aqueous mixture under conditions and for a time effective to form a precipitate suspended in a supernatant, wherein the precipitate comprises pure silica zeolite.

In certain embodiments, the precursors and reagents effective for synthesis of pure silica zeolite comprise a silica source, a hydroxide source, and one or both of a structure directing agent or a seed material.

In certain embodiments, the pure silica zeolite comprises at least about 0.1 mass % of the precipitate.

In certain embodiments, the pure silica zeolite possesses a framework corresponding to one of those selected from the group consisting of AFI, AST, ATS, BEA, BEC, CFI, CHA, DDR, DOH, DON, EUO, FER, GON, IFR, IHW, ISV, ITE, ITH, ITW, IWR, LTA, MEL, MFI, MTF, MTN, MTT, MTW, MWW, NON, RRO, RTE, RUT, RWR, SAS, SGT, SOD, STO, STF, STT and TON, as defined by the International Zeolite Association.

In certain embodiments, the precipitate is calcined at an effective temperature, temperature ramp rate and for an effective period of time to realize porous pure silica zeolite.

In certain embodiments, the pure silica zeolite is Silicalite-1 possessing an MFI structure as designated by the International Zeolite Association. For example, in such embodiments the precursors and reagents effective for synthesis of pure silica zeolite comprises a silica source and a structure directing agent source, wherein the structure directing agent source comprises structure directing agent cations and hydroxide anions associated with the structure directing agent cations as the hydroxide source, and a mass ratio of ODSO to hydroxide anions associated with the structure directing agent cations is in the range of about 0.01-7.3. In such embodiments, a total amount of water for the homogeneous aqueous mixture may comprise utility water, water from a water-containing silica source, and water from a water-containing structure directing agent, and the effective amount of ODSO relative to a sum of the total amount of water and the effective amount of ODSO is between about 0.01-10.3 mass %. In such embodiments, the precursors and reagents effective for synthesis of pure silica zeolite comprises a water-containing silica source, a water-containing structure directing agent; wherein a total amount of water for the homogeneous aqueous mixture includes utility water, water from the water-containing silica source and water from the water-containing structure directing agent; and wherein the effective amount of ODSO relative to a sum of the amount of utility water and the effective amount of ODSO is between about 0.01-31.7 mass %.

In certain embodiments herein: a cumulative amount of ODSO and water is approximately equivalent to an amount of water that is effective to produce pure silica zeolite in the absence of ODSO; the cumulative amount of ODSO and water, an amount of the silica source, and an amount of one or both of a structure directing agent and a seed material are provided at an ODSO-enhanced compositional ratio; the ODSO-enhanced compositional ratio is approximately equivalent to a baseline compositional ratio of water, silica source, and one or both of the optional structure directing agent and the optional seed material, the baseline compositional ratio being effective to produce pure silica zeolite in the absence of ODSO; and the conditions and time of heating are approximately equivalent to those that are effective to produce pure silica zeolite absence of ODSO. In such embodiments, wherein yield of pure silica zeolite may be greater using the ODSO-enhanced compositional ratio as compared to the baseline compositional ratio in the absence of ODSO, wherein the yield increase is in the range of 1-40, 1-30, 1-20, 5-40, 5-30 or 5-20 W %.

In certain embodiments, the precursors and reagents effective for synthesis of pure silica zeolite comprises a silica source selected from the group consisting of sodium silicate (water glass), rice husk, fumed silica, precipitated silica, colloidal silica, silica gels, zeolites, dealuminated zeolites, silicon hydroxides and silicon alkoxides.

In certain embodiments, the precursors and reagents effective for synthesis of pure silica zeolite comprises a structure directing agent to stabilize the structure of the pure silica zeolite, optionally excluding a seed material. For example, a structure directing agent may comprise a cationic constituent selected from the group consisting of secondary or tertiary amines, quaternary ammonium ions, azamacrocycle derived templates, spiro templates, diazabicyclo derived templates, pyridinium, pyrrolium, azanium, diazabicyclooctane, pyrrolidinium, piperidinium, piperazinium, imidazolium, quinolinium, quinuclidinium, hexamethyleneimine, sparteinium and cobaltcenium. In certain embodiments a structure directing agent comprises quaternary ammonium ions. In certain embodiments a structure directing agent comprises tetrapropylammonium hydroxide.

In certain embodiments, the precursors and reagents effective for synthesis of pure silica zeolite comprises a silica source and a seed material, optionally in the absence of a structure directing agent.

In certain embodiments, a pH of the homogeneous aqueous mixture is greater than or equal to about 9, for example in the range of about 9-14, 9-13, 10-14, 10-13, 11-14 or 11-13. In certain embodiments, the homogeneous aqueous mixture is (optionally) aged before being subjected to heating for a period of about 0-48, 0-24, 0-5, 0.5-48, 0.5-24 or 0.5-5 hours; the homogeneous aqueous mixture is heated at a temperature in the range of about 65-200, 65-190, 65-180, 95-200, 95-190, 95-180, 120-200, 120-190, 120-180, 145-200, 145-190 or 145-180° C.; the homogeneous aqueous mixture is heated at autogenous pressure or a pressure in the range of atmospheric to 17 bar; and the homogeneous aqueous mixture is heated for a time period within the range of about 0.1-8, 0.1-6, 0.1-4, 0.2-8, 0.2-6, 0.2-4, 0.3-8, 0.3-6, 0.3-4, 0.5-8, 0.5-6, 0.5-4, 1-8, 1-6, or 1-4 days.

In certain embodiments, the ODSO is derived from oxidation of disulfide oil compounds present in an effluent refinery hydrocarbon stream recovered following catalytic oxidation of mercaptans present in a mercaptan-containing hydrocarbon stream. In certain embodiments, the ODSO comprises ODSO compounds having 3 or more oxygen atoms and 1 to 20 carbon atoms, and are contained in a mixture having an average density greater than about 1.0 g/cc and an average boiling point greater than about 80° C. In certain embodiments, wherein the ODSO comprises ODSO compounds have 3 or more oxygen atoms and include: one or more compounds selected from the group consisting of (R—SOO—SO—R'), (R—SOO—SOO—R'), (R—SO—SOO—OH), (R—SOO—SOO—OH), (R—SOO—SO—OH), (R—SO—SO—OR'), (R—SOO—SO—OR'), (R—SO—SOO—OR') and (R—SOO—SOO—OR'), wherein R and R' can be the same or different C1-C10 alkyl or C6-C10 aryl; two or more compounds selected from the group consisting of (R—SOO—SO—R'), (R—SOO—SOO—R'), (R—SO—SOO—OH), (R—SOO—SOO—OH), (R—SOO—SO—OH), (R—SO—SO—OR'), (R—SOO—SO—OR'), (R—SO—SOO—OR') and (R—SOO—SOO—OR'), wherein R and R' can be the same or different C1-C10 alkyl or C6-C10 aryl; one or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), wherein R and R' can be the same or different C1-C10 alkyl or C6-C10 aryl; or two or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), wherein R and R' can be the same or different C1-C10 alkyl or C6-C10 aryl.

In certain embodiments, the ODSO comprises ODSO compounds contained in a pH-modified water-soluble ODSO composition comprising an aqueous mixture of one or more water-soluble ODSO compounds and an effective amount of an alkaline agent. In certain embodiments, the ODSO comprises ODSO compounds contained in a supernatant from a prior synthesis that utilized water-soluble ODSO as a component.

Any combinations of the various embodiments and implementations disclosed herein can be used. These and other aspects and features can be appreciated from the following description of certain embodiments and the accompanying drawings and claims.

DETAILED DESCRIPTION OF CERTAIN EMBODIMENTS OF THE DISCLOSURE

Figures 1, 2:
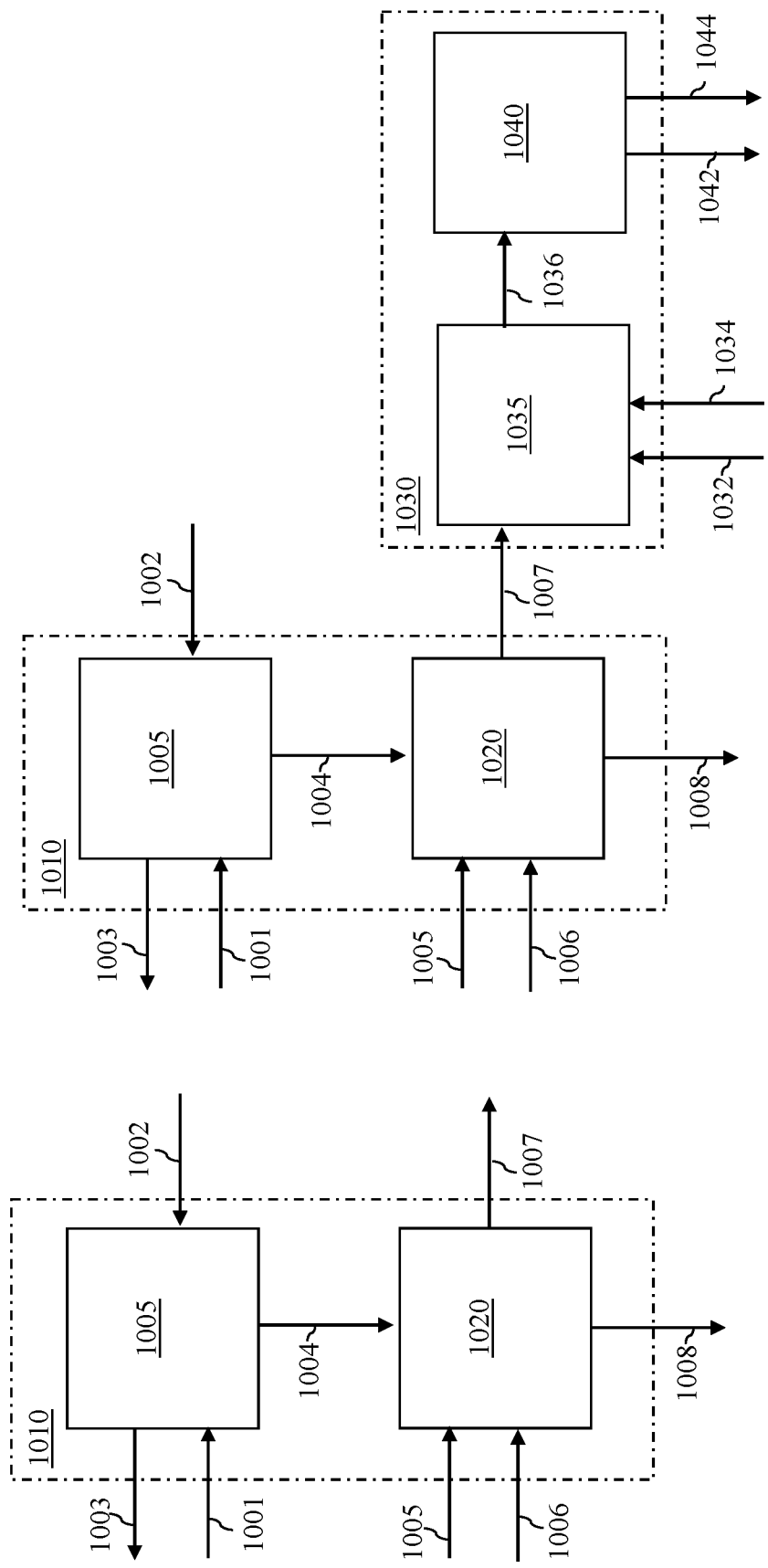
FIG. 1 is a simplified schematic diagram of a generalized version of a conventional mercaptan oxidation or MEROX process for the liquid-liquid extraction of a mercaptan containing hydrocarbon stream.
FIG. 2 is a simplified schematic diagram of a generalized version of an enhanced mercaptan oxidation or E-MEROX process.

The present disclosure is directed to a method to synthesize pure silica zeolites. This is accomplished by using an improved sol-gel formulation including a water-soluble fraction of ODSO as an additional component.

In conventional syntheses of PSZs, water is used as an aqueous medium and as a solvent. In the embodiments of the present disclosure, an effective amount of water-soluble ODSO compounds is added as an additional component within a homogeneous aqueous mixture of precursors and reagents effective for PSZ materials. In certain embodiments, the ODSO is derived from a sulfur-containing refinery waste stream and is used as an additional component for syntheses of PSZs.

In certain embodiments, when compared with an equivalent water-only synthesis that is conventional in the sol-gel syntheses of PSZs, the inclusion of an effective amount of ODSO to the homogeneous aqueous mixture results an increase in the overall PSZ yield compared with an equivalent water-only synthesis for PSZ, with all other parameters fixed. For example, compared with an equivalent water-only synthesis for PSZ, the use of the ODSO compounds in the syntheses herein increases the overall PSZ yield by about 1-40, 1-35, 5-40 or 5-35 mass %.

In certain embodiments the PSZs formed herein, the content of PSZ in a precipitate is at least about 0.1 mass percent, for example in the range of about 0.1-100, 1-100, 5-100, 10-100, 25-100, 50-100, 75-100 or 90-100 mass % (wherein the mass % of PSZ to the combined product mass of PSZ and any other amorphous or crystalline products that are formed). The remainder (if the product is not 100% PSZ) can be amorphous materials and/or other crystalline materials. The amorphous material may comprise silica.

In some embodiments a sol-gel composition is formed that includes precursors and reagents effective for PSZ materials and water-soluble oxidized disulfide oil (ODSO). Precursors and reagents effective for PSZ syntheses comprise a silica source, a hydroxide source, and either a structure directing agent, a seed material or both a structure directing agent and a seed material. In the place of a certain amount of water, an effective amount of water-soluble ODSO is used as an additional component. The components are mixed for an effective time and under conditions suitable to form the homogeneous aqueous mixture. The chronological sequence of mixing can vary, with the objective being a highly homogenous distribution of the components in an aqueous mixture. The homogeneous aqueous mixture is heated under conditions and for a time effective to form a precipitate (product) suspended in a supernatant (mother liquor). The precipitate is recovered, for example by filtration, washing and drying, as PSZ. In certain embodiments the recovered product is calcined at an effective temperature, temperature ramp rate and for an effective period of time to realize porous PSZ. In some embodiments, an increase in a sub-ratio of water-soluble ODSO to water effects an increase in yield of PSZ.

In embodiments herein, syntheses of PSZs includes in its sol-gel a water-soluble ODSO component. The water-soluble ODSO component can be in the form of a neat water-soluble ODSO, as an aqueous water-soluble ODSO solution, a mixture with an alkaline source as a pH modified water-soluble ODSO composition, and/or a supernatant from a prior synthesis using water-soluble ODSO. In embodiments herein, syntheses of PSZs includes an aqueous water-soluble ODSO composition that contributes a portion of requisite utility water for the sol-gel, wherein the water-soluble ODSO composition is used in place of a certain amount of water. In embodiments herein, syntheses of PSZs includes a water-soluble ODSO composition that contributes all or a portion of a requisite anion, such as hydroxide, for the sol-gel, for example, using a pH-modified water-soluble ODSO composition comprising an aqueous mixture of one or more water-soluble ODSO compounds and an effective amount of an alkaline agent as disclosed in co-pending and commonly owned U.S. patent application Ser. No. 17/850,158 filed on Jun. 27, 2022, entitled "pH-Modified Water-Soluble Oxidized Disulfide Oil Compositions" and U.S. patent application Ser. No. 17/850,115 filed on Jun. 27, 2022, entitled "Method of Zeolite Synthesis Including pH-Modified Water-Soluble Oxidized Disulfide Oil Compositions" which are incorporated by reference herein in their entireties. In certain embodiments the water-soluble ODSO component is provided as a pH-modified water-soluble ODSO composition, and is used in place of all or a portion of requisite anion for syntheses of PSZs, and in place of a certain amount of water (including all or a portion of utility water). In embodiments herein, syntheses of PSZs includes supernatant from a prior synthesis that utilized water-soluble ODSO as a component in place of a certain amount of utility water, for example as disclosed in co-pending and commonly owned U.S. patent application Ser. No. 17/850,285 filed on Jun. 27, 2022, entitled "Method of Synthesizing Materials Integrating Supernatant Recycle" which is incorporated by reference herein in its entirety.

An effective amount of water for the aqueous environment and as a solvent during the sol-gel process can be provided from one or more water sources, including utility water that is added to form the homogeneous aqueous mixture, and/or water from precursors and reagents used to form the PSZ, such as from a water-containing silica source, a water-containing structure directing agent in embodiments in which structure directing agent is used, and/or a water-containing seed material in embodiments in which a seed material is used. These mixture components are added with water to the reaction vessel prior to heating. Typically, water allows for adequate mixing to realize a more homogeneous distribution of the sol-gel components, which ultimately produces a more desirable product because each crystal is more closely matched in properties to the next crystal. Insufficient mixing could result in undesirable "pockets" of highly concentrated sol-gel components and this may lead to impurities in the form of different structural phases or morphologies. Water also determines the yield per volume. In the descriptions that follow, it is understood that water is a component of homogeneous aqueous mixtures from one or more of the sources of water.

In embodiments herein, a portion of the effective amount of water required for sol-gel synthesis of PSZs is replaced with a water soluble ODSO. The water that is replaced with water soluble ODSO can be all or a portion of the utility water that would typically be added, and/or all or a portion of water from precursors and reagents effective for PSZ syntheses.

As described herein, precursors and reagents effective for PSZ syntheses comprise a silica source, a hydroxide source, and one or both of a structure directing agent and a seed material. For example, in certain known synthesis a structure directing agent is used and a seed material is optional, and in further embodiments a seed material is used and a structure directing agent is optional. The present disclosure is applicable to various PSZs that are synthesized hydrothermally, which can benefit from inclusion of ODSO components. Suitable PSZ materials include but are not limited to those possessing frameworks corresponding to one or more of: AFI such as SSZ-24, AST such as octadecasil, ATS such as SSZ-55d, BEA such as beta, BEC such as ITQ-14, CFI such as CIT-5, CHA such as chabazite, DDR such as deca-dodecasil, DOH such as dodecasil-1H, DON such as UTD-1, EUO such as EU-1, FER such as ferrierite, GON such as GUS-1, IFR such as SSZ-42 or ITQ-4, IHW such as ITQ-32, ISV such as ITQ-7, ITE such as ITQ-3, ITH such as ITQ-13, ITW such as ITQ-12, IWR such as ITQ-24, LTA such as ITQ-29, MEL such as ZSM-11, MFI such as silicalite or Silicalite-1, MTF such as MCM-35, MTN such as ZSM-39 or dodecasil-3c, MTT such as ZSM-23, MTW such as ZSM-12, MWW such as ITQ-1, MCM-22 or SSZ-25, NON such as nonasil, RRO such as RUB-41, RTE such as RUB-3, RUT such as RUB-10, RWR such as RUB-24, SAS such as SSZ-73, SGT such as sigma-2, SOD such as sodalite trioxane, STO such as SSZ-31, STF such as SSZ-35, ITQ-9 or MU-26 (STF), STT such as SSZ-23, and TON such as theta-1.

In an embodiment of a method of synthesizing PSZs, effective amounts and proportions of precursors and reagents are formed together with water-soluble ODSO as a homogeneous aqueous mixture, including a water source, a silica source, a hydroxide source, and one or both of a structure directing agent and a seed material. An effective amount of a water-soluble ODSO component is used as an additional component in the syntheses processes herein. The water-soluble ODSO component can be in the form of a neat water-soluble ODSO, as an aqueous water-soluble ODSO solution, a mixture with an alkaline source as a pH modified water-soluble ODSO composition (as disclosed in U.S. patent application Ser. Nos. 17/850,158 and 17/850,115, both filed on Jun. 27, 2022 and incorporated by reference hereinabove), and/or a supernatant from a prior synthesis using water-soluble ODSO (as disclosed in U.S. patent application Ser. No. 17/850,285 filed on Jun. 27, 2022 and incorporated by reference hereinabove).

The components are mixed for an effective time and under conditions suitable to form the homogeneous aqueous mixture. The homogeneous aqueous mixture is heated under conditions and for a time effective to form a precipitate (product) suspended in a supernatant (mother liquor). The precipitate is recovered, for example by filtration, washing and drying, and according to the methods herein, the relative amount of water-soluble ODSO in the initial homogeneous aqueous mixture is effective to synthesize crystalline PSZ material.

The chronological sequence of mixing can vary, with the objective being a highly homogenous distribution of the components in an aqueous mixture. In certain embodiments, the homogeneous aqueous mixture is formed by: providing a silica source; combining one or both of a structure directing agent and a seed material; and combining water soluble ODSO. Alternatively, water soluble ODSO is combined with one or both of a structure directing agent and a seed material to form a mixture, and that mixture is combined with a silica source. In certain embodiments, the homogeneous aqueous mixture is formed by: providing one or both of a structure directing agent and a seed material; combining a silica source; and combining a water soluble ODSO. Alternatively, water soluble ODSO is combined with a silica source, and that mixture is combined with one or both of a structure directing agent and a seed material. In certain of the above embodiments, the hydroxide source may be from the source of structure directing agent. In certain of the above embodiments, an optional alkali metal source may be added as a source of hydroxide wherein a seed material is used and there is insufficient hydroxide from other sources, such as in the absence of reduced amount of structure directing agent.

A homogeneous aqueous mixture of the precursors and reagents, including water soluble ODSO, is formed from any of the above chronological sequences of component addition or other suitable chronological sequence. According to embodiments of the methods herein, the relative amount of water-soluble ODSO in the initial homogeneous aqueous mixture is effective to synthesize PSZ. The components are mixed for an effective time and under conditions suitable to form the homogeneous aqueous mixture. The homogeneous aqueous mixture is heated under conditions and for a time effective to form a precipitate (product) suspended in a supernatant (mother liquor). The precipitate is recovered, for example by filtration, washing and drying. In certain embodiments the recovered precipitate is calcined at an effective temperature, temperature ramp rate and for an effective period of time.

The eventual framework of the as-made PSZ depends on various factors including but not limited to the time and/or temperature of hydrothermal reaction; amount and selection of alkali metal (if any); amount and selection of structure directing agents (if any); and/or amount and selection of seed material (if any). For instance, as disclosed in the herein examples, Silicalite-1 is synthesized with an MFI framework. Note that while both Silicalite-1 and ZSM-5 possess MFI frameworks, ZSM-5 is an aluminosilicate whereas Silicalite-1 is a pure silica analogue.

In the embodiments herein the silica source can comprise, without limitation, one or more of silicates including sodium silicate (water glass), rice husk, fumed silica, precipitated silica, colloidal silica, silica gels, other zeolites, dealuminated zeolites, and silicon hydroxides and alkoxides. Silica sources resulting in a high relative yield are preferred.

In the syntheses of PSZs, it is typically necessary to use at least one of a structure directing agent, pore filling agents or seed material. In certain embodiments, a structure directing agent is used and pore filling agents and seed material is not used. In certain embodiments, a seed material is used and a structure directing agent is not required. In the above embodiments in which a structure directing agent is used, the selection and amount of structure directing agent influences the target type of crystalline material structure to be formed. Effective structure directing agents that be added include known or developed structure directing agents for a particular type of PSZ. Preparation of PSZs with structure directing agents enables direction of the structure, and filling of the pores/channels in the as-made products. In certain embodiments pore filling agents are used with structure directing agents as additional material to fill pores and maintain pore stability and structural integrity. In addition, in embodiments herein structure directing agents include a cation and an anion, wherein the anion is a hydroxide for the PSZ syntheses. In certain embodiments the structure directing agents is the only source of hydroxide anions during synthesis. In additional embodiments, hydroxide from other sources can be provided together with a hydroxide form of a structure directing agent. In some embodiments another source of hydroxide anions includes from an optional mineralizer or an optional alkali metal source (such as sodium, as NaOH or Na$_2$O that forms NaOH with water). In some embodiments another source of hydroxide anions is a silica source in optional embodiments using such a silica source, for instance silicon hydroxide or sodium silicate. Hydroxide from other sources can be used in embodiments that use a structure directing agent in a form other than the hydroxide form (such as with a bromine anion, or if alcohols or other non-hydroxide pore fillers are used), or when a seed material is used in absence of a structure directing agent.

In general, effective structure directing agents for PSZs include compounds having one or more of the following cationic constituents: secondary or tertiary amines; quaternary ammonium ions; azamacrocycle derived templates, spiro templates or diazabicyclo derived templates; cyclic amines including one or more of pyridinium, pyrrolium, azanium, diazabicyclooctane, pyrrolidinium, piperidinium, piperazinium, imidazolium, quinolinium, quinuclidinium or hexamethyleneimine; sparteinium; cobaltcenium. The cations can be paired with one or more of a hydroxide anion, a bromide anion, an iodide anion or a fluoride ion. For example, the references cited in the Wragg et al. review paper cited hereinabove disclose several structure directing agents for syntheses of PSZs of various frameworks, any of which are suitable structure directing agents for the processes herein. In some embodiments another suitable organic structure directing agent known for syntheses of PSZs can be used. In some embodiments pore-fillers or other templates including one or more of alcohols (including glycols such as ethylene glycol), ketones, morpholine or glycerol serve as a structure directing agent.

In some embodiments, suitable cationic constituents for structure directing agents include but are not limited to one or more of: tetrapropylammonium (TPA), tetramethylammonium (TMA), N,N,N-trimethyl-1-adamantammonium (TMAda), [(1-(3-fluorophenyl)cyclopentyl)methyl]trimethylammonium, tetraethyl ammonium (TEA), dimethylpropylammonium and alkyl ammonium; examples of such structure directing agents include tetrapropylammonium hydroxide (TPAOH), tetrapropylammonium bromide (TPABr), N,N,N-trimethyl-1-adamantammonium hydroxide (TMAdaOH), [(1-(3-fluorophenyl)cyclopentyl)methyl]trimethylammonium hydroxide, tetraethyl ammonium hydroxide (TEAOH), dimethylpropylammonium hydroxide and alkyl ammonium hydroxide.

In some embodiments, suitable cationic constituents for structure directing agents include but are not limited to one or more of: tetramethylene bisquinuclidinium, pyridine, N,N-dimethyl-6-azanium-1,3,3-trimethylbicyclo[3.2.1]octane (DMABO), 1,1'-butylenedi (4-aza-1-azonia-2,5-dimethylbicyclo[2.2.2]octane)dihydroxide, N-benzyl-1,4-diazabicyclo[2.2.2]octane cation (DABCO), N-benzyl-1-azoniumbicyclo[2,2,2]octane cation, benzylquinuclidinium hydroxide (BQ), hydroxybenzylquinuclidinium hydroxide (BQol) (or bromide or fluoride forms of hydroxybenzylquinuclidinium), N,N,N',N'-tetramethyldecahydrocyclobuta[1,2-c; 3,4-c']dipyrrolidinium, 4-cyclohexyl-1,1-dimethylpiperazinium, 1,3,3-trimethyl-6-azoniumtricyclo[3.2.1.46,6]dodecane, 1,3,3,6,6-pentamethyl-6-azoniabicyclo[3.2.1.]octane, 1,2,3-trimethylimidazolium, 1,3,4-trimethylimidazolium, 4,8-(2-methyl)-ethenobenzo[1,2-c: 4,5-c']dipyrrolium-4-methyl-2,2,6,6-tetraethyl, 4-methyl-2,3,6,7-tetrahydro-1H,5H-pyrido[3.2.1-ij]quinolinium, N,N-diethyl-3,5-dimethylpiperidinium, 3-ethyl-1,3,8,8-tetramethyl-3-azoniabicyclo[3.2.1]octane cation, or N,N-diethyl-2,5-cis-dimethylpiperidinium (DECDMP); tetramethylene bisquinuclidinium hydroxide, N,N-dimethyl-6-azanium-1,3,3-trimethylbicyclo[3.2.1]octane hydroxide, N,N,N',N'-tetramethyldecahydrocyclobuta[1,2-c; 3,4-c']dipyrrolidinium hydroxide, 4-cyclohexyl-1,1-dimethylpiperazinium hydroxide, 1,3,3-trimethyl-6-azoniumtricyclo[3.2.1.46,6]dodecane hydroxide, 1,3,3,6,6-pentamethyl-6-azoniabicyclo[3.2.1.]octane hydroxide, of 1,2,3-trimethylimidazole hydroxide, 1,3,4-trimethylimidazole, 4,8-(2-methyl)-ethenobenzo[1,2-c: 4,5-c']dipyrrolium-4-methyl-2,2,6,6-tetraethyl-1,2,3,3a,4a,5,6,7,7a,8a-decahydrodihydroxide, 4-methyl-2,3,6,7-tetrahydro-1H,5H-pyrido[3.2.1-ij]quinolinium hydroxide, N,N-diethyl-3,5-dimethylpiperidinium hydroxide, or N,N-diethyl-2,5-cis-dimethylpiperidinium hydroxide (DECDMP).

In some embodiments, suitable cationic constituents for structure directing agents include but are not limited to one more of: N-methyl sparteinium, bis(pentamethylcyclopentadienyl) cobalt (III), hexamethonium, $PhCH_2N(CH_3)_3^+$, $(C_4H_9)_4N^+$, cobaltcenium or exo-2-amino-bicyclo[2.2.1]heptane; examples of such structure directing agents include N-methyl sparteinium hydroxide, bis(pentamethylcyclopentadienyl) cobalt (III) hydroxide, hexamethonium bromide, hexamethonium dihydroxide, $PhCH_2N(CH_3)_3Cl$ and $(C_4H_9)_4NCl$, cobaltcenium hexafluorophosphate.

The disclosed process to synthesize PSZs can occur in the absence or presence of seed materials comprising crystalline structures of the same or similar crystalline framework structure as the target crystalline framework for production. In certain embodiments, a seed material can be used with or without a structure directing agent. For example suitable seed materials include materials which possess a framework corresponding to one or more of: AFI such as SSZ-24, AST such as octadecasil, ATS such as SSZ-55d, BEA such as beta, BEC such as ITQ-14, CFI such as CIT-5, CHA such as chabazite, DDR such as deca-dodecasil, DOH such as dodecasil-1H, DON such as UTD-1, EUO such as EU-1, FER such as ferrierite, GON such as GUS-1, IFR such as SSZ-42 or ITQ-4, IHW such as ITQ-32, ISV such as ITQ-7, ITE such as ITQ-3, ITH such as ITQ-13, ITW such as ITQ-12, IWR such as ITQ-24, LTA such as ITQ-29, MEL such as ZSM-11, MFI such as silicalite or Silicalite-1, MTF such as MCM-35, MTN such as ZSM-39 or dodecasil-3c, MTT such as ZSM-23, MTW such as ZSM-12, MWW such as ITQ-1, MCM-22 or SSZ-25, NON such as nonasil, RRO such as RUB-41, RTE such as RUB-3, RUT such as RUB-10, RWR such as RUB-24, SAS such as SSZ-73, SGT such as sigma-2, SOD such as sodalite trioxane, STO such as SSZ-31, STF such as SSZ-35, ITQ-9 or MU-26 (STF), STT such as SSZ-23, and TON such as theta-1. Functions of the seed materials include, but are not limited to: supporting growth on the surface of the seed, that is, where crystallization does not undergo nucleation but rather crystal growth is directly on the surface of the seed; the parent gel and seed share common larger composite building units; the parent gel and seed share common smaller units, for instance 4 member rings; seeds that undergo partial dissolution to provide a surface for crystal growth of a zeolitic structure; crystallization occurs through a "core-shell" mechanism with the seed acting as a core and the target material grows on the surface; and/or where the seeds partially dissolve providing essential building units that can orientate crystallization of the zeolitic structure.

In the above embodiments in which a mineralizer is used, for example wherein the amount of hydroxide from other sources is insufficient (e.g., in the absence of a structure directing agent or a reduced amount of a structure directing agent), it may be an alkali metal source from the Periodic Table IUPAC Group 1 alkaline metals. In certain embodiments, these are hydroxide mineralizers, for example, these are selected from the group consisting of NaOH, KOH, RbOH, LiOH, CsOH and combinations thereof. In certain embodiments a Na-based hydroxide mineralizer is selected.

The mixing steps typically occur at ambient temperature and pressure (for instance about 20° C. and about 1 standard atmosphere), for a time is sufficient to realize a homogeneous distribution of the components. In certain embodiments the sol-gel can be aged before being subjected to subsequent hydrothermal treatment, for example for a period of about 0-48, 0-24, 0-5, 0.5-48, 0.5-24 or 0.5-5 hours. Hydrothermal treatment is then carried out at a temperature in the range of about 65-200, 65-190, 65-180, 95-200, 95-190, 95-180, 120-200, 120-190, 120-180, 145-200, 145-190 or 145-180° C. and at atmospheric or autogenous pressure (from the sol-gel or from the sol-gel plus an addition of a gas purge into the vessel prior to heating), and for a suitable time period, for example within the range of about 0.1-8, 0.1-6, 0.1-4, 0.2-8, 0.2-6, 0.2-4, 0.3-8, 0.3-6, 0.3-4, 0.5-8, 0.5-6, 0.5-4, 1-8, 1-6, or 1-4 days, to ensure crystallization and formation of a zeolite gel or a gel for other crystalline material. As is known, these time periods and temperatures can vary depending on the desired zeolite or other crystalline material framework to be produced.

The products are washed, for example with water at a suitable quantity, for example at about twice the volume of the sol-gel solution. The wash can be at a temperature of from about 20-80° C. at atmospheric, vacuum or under pressure. The wash can continue until the pH of the filtrate approaches about 7-9 in basic systems, and about 5-7 in acidic systems. The solids are recovered by filtration, for instance, using known techniques such as centrifugation, gravity, vacuum filtration, filter press, or rotary drums, and dried, for example at a temperature of up to about 110-150° C.

In certain embodiments, recovered precipitate is calcined at a suitable temperature, temperature ramp rate and for a suitable period of time. In certain embodiments, calcining is carried out to increase porosity. In certain embodiments, calcining is carried out to remove all or a portion of structure directing agent components that remain in the precipitate to realize porous zeolite. In optional embodiments in which calcination is carried out on the products, conditions for calcination can include temperatures in the range of about 450-700, 450-600, 500-700 or 500-600° C., atmospheric pressure, and a time period of about 3-24, 3-18, 6-24 or 6-18 hours. Calcining can occur with ramp rates in the range of from about 0.1-10, 0.1-5, 0.1-3, 1-10, 1-5 or 1-3° C. per minute. In certain embodiments calcination can have a first step ramping to a temperature of between about 100-150° C. with a holding time of from about 2-24 hours (at ramp rates of from about 0.1-5, 0.1-3, 1-5 or 1-3° C. per min) before increasing to a higher temperature with a final holding time in the range of about 2-24 hours.

Effective ratios of precursors and reagents for production of zeolites herein are within those known to produce templated aluminosilicate zeolites and can be determined by those of ordinary skill in the art. It is to be appreciated by those skilled in the art that in certain embodiments effective baseline compositional ratios for syntheses of PSZs as disclosed herein can be determined by empirical data, for instance summarized as phase boundary diagrams or other methodologies as is known in material synthesis. In certain embodiments, baseline compositional ratios of the aqueous composition used to produce PSZs herein include (on a molar basis):

$OH^-/SiO_2$:0.01-10,0.1-10,1-10,0.01-5,0.1-5 or 1-5

$R/SiO_2$:0-1.0,0.1-1.0,0-0.5 or 0.1-0.5

Alkali metal cation/$SiO_2$:0-30,0.1-30,1-30,0-20,0.1-20 or 1-20

$H_2O/SiO_2$:5-80,10-80 or 20-80 wherein R is the structure directing agent; and a level of 0 for R or seed material represents absence of the component.

The seed component may also be present based on a mass percentage of total silica in the system, for example in the range of about 0-15, 0.1-15, 0-10, 0.1-10, 0-7.5, 0.1-7.5, 0-5 or 0.1-5 percent by mass based on the mass of silica. It is appreciated by those skilled in the art that these molar composition ratios can be expressed on a mass basis.

As is known, different ratios of materials are used depending on the desired PSZ framework to be produced. In the embodiments herein, ratios of components in homogeneous aqueous mixtures including water soluble ODSO are sometimes referred to as "water soluble ODSO-enhanced compositional ratios." In certain embodiments a water soluble ODSO-enhanced compositional ratio is one in which water soluble ODSO is included to replace an approximately equivalent mass of a certain amount of water in the homogeneous aqueous mixture, and wherein a cumulative amount of water soluble ODSO and water (water soluble ODSO+ $H_2O$) is approximately equivalent to a mass of water that is effective to produce the same or another type of PSZ, in the absence of water soluble ODSO; and wherein the conditions and time of heating the sol-gel having the water soluble ODSO-enhanced compositional ratio is approximately equivalent to those that are effective to produce the same or another type of PSZ in the absence of water soluble ODSO. ODSO The present disclosure includes one or more water-soluble ODSO compounds that are used as a component in synthesis of PSZs. The additional components can be a mixture that comprises two or more ODSO compounds. In the description herein, the terms "oxidized disulfide oil", "ODSO", "ODSO mixture" and "ODSO compound(s)" may be used interchangeably for convenience. As used herein, the abbreviations of oxidized disulfide oils ("ODSO") and disulfide oils ("DSO") will be understood to refer to the singular and plural forms, which may also appear as "DSO compounds" and "ODSO compounds," and each form may be used interchangeably. In certain instances, a singular ODSO compound may also be referenced.

As disclosed herein, in certain embodiments a water-soluble ODSO component includes a pH-modified water-soluble ODSO composition can be used. Such a pH-modified water-soluble ODSO composition is disclosed in U.S. patent application Ser. Nos. 17/850,158 and 17/850,115 filed on Jun. 27, 2022, hereinabove incorporated by reference. The pH-modified water-soluble ODSO composition comprises an acidic water-soluble ODSO composition and an alkaline agent. In certain embodiments, the pH-modified WS-ODSO composition provides a portion of requisite water to form the aqueous mixture. In certain embodiments, the pH-modified WS-ODSO composition provides sufficient water to avoid added utility water. In certain embodiments, the pH-modified WS-ODSO composition provides a portion of requisite hydroxide to the homogeneous aqueous mixture to produce PSZ. In certain embodiments, the alkaline agent is selected from the group consisting of sodium hydroxide, calcium hydroxide, lithium hydroxide, strontium hydroxide, barium hydroxide, potassium hydroxide, cesium hydroxide, rubidium hydroxide, ammonia, ammonium hydroxide, lithium hydroxide, zinc hydroxide, trimethylamine, pyridine, beryllium hydroxide, magnesium hydroxide, and combinations of one of the foregoing alkaline agents. In certain embodiments, the alkaline agent is selected from the group consisting of sodium hydroxide, potassium hydroxide, rubidium hydroxide, lithium hydroxide, cesium hydroxide, and combinations of one of the foregoing alkaline agents, which contributes hydroxide and an alkali metal source as sodium, potassium, rubidium, lithium or cesium.

As disclosed herein, in certain embodiments a water-soluble ODSO component includes supernatant from a prior synthesis that utilized water-soluble ODSO. Such a process is disclosed in U.S. patent application Ser. No. 17/850,285 filed on Jun. 27, 2022, hereinabove incorporated by reference. In such a process, a first synthesis of a first material is carried out using water soluble ODSO as a component (as-is, or as a pH modified composition). All or a portion of a precipitate is separated from a supernatant, and that supernatant from an ODSO synthesis is used as a water-soluble ODSO component herein. In certain embodiments, the supernatant from an ODSO-enhanced synthesis provides a portion of requisite water to form the aqueous mixture. In certain embodiments, the supernatant from an ODSO-enhanced synthesis provides sufficient water to avoid added utility water. In certain embodiments, the supernatant from an ODSO-enhanced synthesis provides a portion of requisite anions to the homogeneous aqueous mixture to produce PSZs.

It is noted that various factors can contribute to quantity of ODSO, including the type of PSZ formed, and the ratios of other precursors and reagents. In certain embodiments for certain PSZ syntheses, the basic components from all of the sources are provided in effective amounts so as to maintain the homogeneous mixture at a pH level of greater than or equal to about 9, for example in the range of about 9-14, 9-13, 10-14, 10-13, 11-14 or 11-13. In certain embodiments in which a structure directing agent is used that includes associated anions such as hydroxide anions, the overall pH is influenced by such anions associated with the structure directing agent. In certain embodiments in which an alkali metal source is used that includes associated anions such as hydroxide anions, the overall pH is influenced by such anions associated with the alkali metal source. In certain embodiments in which a silica source is used that includes associated anions such as hydroxide anions or alkoxides, the overall pH is influenced by such anions associated with the silica source. In certain embodiments in which a pH-modified water-soluble ODSO composition, or supernatant from a prior synthesis that utilized water-soluble ODSO, is employed as the water-soluble ODSO component, the overall pH is influenced by anions from that component. In the process herein, the pH is reduced by the presence of ODSO, therefore, the quantity of the basic compound from one or more of the aforementioned sources can be adjusted accordingly to attain the requisite pH.

The amount of ODSO added can be quantified by one or more methods. For example, in certain embodiments an amount of ODSO is expressed based on an amount of water from a baseline synthesis that is replaced. In certain embodiments, the amount of ODSO is expressed based on an amount of "utility" water, typically distilled water (also referred to as "free" water), and may be expressed, for example, as (mass of ODSO)/[(mass of ODSO)+(mass of utility water)]. In certain embodiments, the amount of ODSO is expressed based on a total amount of water, including utility water and water from the precursors and reagents, and may be expressed, for example, as (mass of ODSO)/[(mass of ODSO)+(total mass of water from all sources)]. In certain embodiments, the amount of ODSO is expressed based on a total amount of hydroxide anions (on a molar or mass basis), and may be expressed, for example, as (mass of ODSO)/(mass of hydroxide) or as (moles of ODSO)/(moles of hydroxide), where an average molecular weight of ODSO is in the range of about 130-160. In certain embodiments in which an amount of ODSO is expressed based on a total amount of hydroxide anions, the ratio may be expressed based on hydroxide anions added to the initial sol-gel, for instance associated with a structure directing agent and optionally another source, and exclude any in-situ generated hydroxide, for instance by hydrolysis of the Si source such as TEOS to produce ethanol. In certain embodiments, the amount of ODSO is expressed based on a total amount of Si in the initial sol-gel, and may be expressed, for example, as (mass of ODSO)/(mass of Si) or as (moles of ODSO)/(moles of Si).

In certain embodiments, precursors and reagents effective for synthesis of pure silica zeolite includes hydroxide, the PSZ comprises Silicalite-1 zeolite having the (MFI) framework, and an effective amount of ODSO is a mass ratio of ODSO to hydroxide in the range of about 0.01-7.3 or 0.01-7.0.

In certain embodiments, the one or more ODSO compounds are contained in a mixture with one or more catalytically active components and ODSO, as an active component carrier composition (as disclosed in co-pending and commonly owned U.S. application Ser. No. 17/720,434 filed Apr. 14, 2022, entitled "Active Component Carrier Composition, and Method for Manufacture of Catalyst Materials," which is incorporated by reference herein in its entirety). One or more catalytically active components are included in a mixture with one or more ODSO compounds. The one or more active components can vary, depending upon the application of the catalyst being manufactured. The active component can be a metal or a non-metal, in elemental form or as a compound such as oxides, carbides or sulfides. For instance, one or more active components for hydrotreating catalysts can include one or more metals or metal compounds selected from the Periodic Table of the Elements IUPAC Groups 4-12. In certain embodiments one or more active components are selected for producing hydrotreating catalysts and can include one or more metals or metal compounds selected from the Periodic Table of the Elements IUPAC Groups 6-10 (for example Co, Ni, Mo, and combinations thereof). In certain embodiments one or more active components are selected for producing hydrocracking catalysts and can include one or more metals or metal compounds selected from the Periodic Table of the Elements IUPAC Groups 6-10 (for example Co, Ni, W, Mo, and combinations thereof). In certain embodiments one or more active components are selected for producing catalytic reforming catalysts and can include one or more metals or metal compounds selected from the Periodic Table of the Elements IUPAC Groups 8-10 (for example Pt or Pd). In certain embodiments one or more active components are selected for producing hydrogenation catalysts and can include one or more metals or metal compounds selected from the Periodic Table of the Elements IUPAC Groups 7-10 (for example Pt or Pd), and/or one or more non-metal compound such as P. In certain embodiments one or more active components are selected for producing oxidation catalysts and can include one or more metals or metal compounds selected from the Periodic Table of the Elements IUPAC Groups 4-10 (for example Ti, V, Mn, Co, Fe, Cr and Mo) or from the Periodic Table of the Elements IUPAC Groups 4-12 (for example Ti, V, Mn, Co, Fe, Cr, Cu, Zn, W, Mo).

In certain embodiments, the produced aqueous liquid mixture comprises one or more ODSO compounds that are contained in reaction products, or a fraction of reaction products, derived from controlled catalytic oxidation of disulfide oil compounds in the presence of an oxidation catalyst containing one or more transition metals. For example, as described above and in commonly owned U.S. Pat. No. 10,807,947 which is incorporated by reference herein in its entirety, a controlled catalytic oxidation of MEROX process by-products DSO can be carried out. The resulting oxidized effluents contain ODSO. As disclosed in 10,807,947, the by-product DSO compounds from the mercaptan oxidation process can be oxidized, typically in the presence of a catalyst. The oxidant can be a liquid peroxide selected from the group consisting of alkyl hydroperoxides, aryl hydroperoxides, dialkyl peroxides, diaryl peroxides, peresters and hydrogen peroxide. The oxidant can also be a gas, including air, oxygen, ozone and oxides of nitrogen. In embodiments herein, a catalyst is used in the oxidation process. The oxidation catalyst can contain one active metals from IUPAC Groups 4-10 or from Groups 4-12 of the Periodic Table. In certain embodiments oxidation catalyst are metals or metal compounds containing one or more transition metals. In certain embodiments oxidation catalyst are metals or metal compounds containing one or more metals selected from the group consisting of Ti, V, Mn, Co, Fe, Cr, Cu, Zn, W, Mo and combinations thereof. In certain embodiments oxidation catalyst are compounds containing one or more metals or metal compounds selected from the group consisting of Mo, W, V, Ti, and combinations thereof. In certain embodiments oxidation catalyst are compounds containing one or more metals or metal compounds selected from the group consisting of Mo (VI), W (VI), V (V), Ti (IV), and combinations thereof. In certain embodiments, suitable homogeneous catalysts include molybdenum acetylacetonate, bis(acetylacetonate)dioxomolybdenum, molybdenum naphthenate, molybdenum hexacarbonyl, tungsten hexacarbonyl, sodium tungstate and vanadium pentoxide. In certain embodiments, a suitable catalyst is sodium tungstate, $Na_2WO_4 \cdot 2H_2O$.

In certain embodiments ODSO is obtained from controlled catalytic oxidation of disulfide oils from mercaptan oxidation processes. The effluents from controlled catalytic oxidation of disulfide oils from mercaptan oxidation processes includes ODSO compounds and in certain embodiments DSO compounds that were unconverted in the oxidation process. In certain embodiments this effluent contains water-soluble compounds and water-insoluble compounds. The effluent contains at least one ODSO compound, or a mixture of two or more ODSO compounds, selected from the group consisting of compounds having the general formula (R—SO—S—R'), (R—SOO—S—R'), (R—SOO—SO—R'), (R—SOO—SOO—R'), (R—SO—SO—R'), (R—SO—SOO—OH), (R—SOO—SOO—OH), (R—SO—SO—OH), (R—SOO—SO—OH), (R—SO—SO—OR'), (R—SOO—SO—OR'), (R—SO—SOO—OR') and (R—SOO—SOO—OR'), wherein R and R' can be the same or different C1-C10 alkyl or C6-C10 aryl. It will be understood that since the source of the DSO is a refinery feedstream, the R and R' substituents vary, e.g., methyl and ethyl subgroups, and the number of sulfur atoms, S, in the as-received feedstream to oxidation can extend to 3, for example, trisulfide compounds.

In embodiments herein the water-soluble compounds and water-insoluble compounds are separated from one another, and the ODSO used herein comprises all or a portion of the water-soluble compounds separated from the total effluents from oxidation of disulfide oils from mercaptan oxidation processes. For example, the different phases can be separated by decantation or partitioning with a separating funnel, separation drum, by decantation, or any other known apparatus or process for separating two immiscible phases from one another. In certain embodiments, the water-soluble and water-insoluble components can be separated by distillation as they have different boiling point ranges. It is understood that there will be crossover of the water-soluble and water-insoluble components in each fraction due to solubility of components, typically in the ppmw range (for instance, about 1-10,000, 1-1,000, 1-500 or 1-200 ppmw). In certain embodiments, contaminants from each phase can be removed, for example by stripping or adsorption.

In certain embodiments ODSO used herein comprises, consists of or consists essentially of at least one ODSO compound having 3 or more oxygen atoms that is selected from the group consisting of compounds having the general formula (R—SOO—SO—R'), (R—SOO—SOO—R'), (R—SO—SOO—OH), (R—SOO—SOO—OH), (R—SOO—SO—OH), (R—SO—SO—OR'), (R—SOO—SO—OR'), (R—SO—SOO—OR') and (R—SOO—SOO—OR'). In certain embodiments ODSO used herein comprises, consists of or consists essentially of a mixture or two or more ODSO compounds having 3 or more oxygen atoms, that is selected from the group consisting of compounds having the general formula (R—SOO—SO—R'), (R—SOO—SOO—R'), (R—SO—SOO—OH), (R—SOO—SOO—OH), (R—SOO—SO—OH), (R—SO—SO—OR'), (R—SOO—SO—OR'), (R—SO—SOO—OR') and (R—SOO—SOO—OR'). In certain embodiments ODSO used herein comprises, consists of or consists essentially of ODSO compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), and mixtures thereof. In certain embodiments, in the above formulae R and R' are C1-C10 alkyl or C6-C10 aryl. In certain embodiments, the R and R' are methyl and/or ethyl groups. In certain embodiments, the WS-ODSO compound(s) used herein have 1 to 20 carbon atoms.

In certain embodiments, the ODSO compounds used herein comprise, consist of or consist essentially of ODSO compounds having an average density greater than about 1.0 g/cc. In certain embodiments, the ODSO compounds used herein comprise, consist of or consist essentially of ODSO compounds having an average boiling point greater than about 80° C. In certain embodiments, the ODSO compounds used herein comprise, consist of or consist essentially of ODSO compounds having a dielectric constant that is less than or equal to 100 at 0° C.

Table 1 includes examples of polar ODSO compounds that contain 3 or more oxygen atoms. In certain embodiments the identified ODSO compounds are obtained from a water-soluble fraction of the effluents from oxidation of DSO obtained from MEROX by-products. The ODSO compounds that contain 3 or more oxygen atoms are water-soluble over effectively all concentrations, for instance, with some minor amount of acceptable tolerance for carry over components from the effluent stream and in the water insoluble fraction with 2 oxygen atoms of no more than about 1, 3 or 5 mass percent.

In certain embodiments the ODSO compounds contained in an oxidation effluent stream that is derived from controlled catalytic oxidation of MEROX process by-products, DSO compounds, as disclosed in U.S. Pat. Nos. 10,807,947 and 10,781,168 and as incorporated herein by reference above.

In some embodiments, the ODSO are derived from oxidized DSO compounds present in an effluent refinery hydrocarbon stream recovered following the catalytic oxidation of mercaptans present in the hydrocarbon stream. In some embodiments, the DSO compounds are oxidized in the presence of a catalyst. The effluent hydrocarbon stream recovered following the catalytic oxidation of disulfide oil present in the hydrocarbon stream generally comprises a mixture of ODSO compounds as described herein and other sulfur compounds including sulfonic acids, for example methane sulfonic acid, ethane sulfonic acid, or an alkyl sulfonic acid (the alkyl group being based on the R group of the DSO being oxidized.

As noted above, the designation "MEROX" originates from the function of the process itself, that is, the conversion of mercaptans by oxidation. The MEROX process in all of its applications is based on the ability of an organometallic catalyst in a basic environment, such as a caustic, to accelerate the oxidation of mercaptans to disulfides at near ambient temperatures and pressures. The overall reaction can be expressed as follows:

$$\text{RSH} + \tfrac{1}{4} \text{O}_2 \longrightarrow \tfrac{1}{2} \text{RSSR} + \tfrac{1}{2} \text{H}_2\text{O} \qquad (1)$$

where R is a hydrocarbon chain that may be straight, branched, or cyclic, and the chains can be saturated or unsaturated. In most petroleum fractions, there will be a mixture of mercaptans so that the R can have 1, 2, 3 and up to 10 or more carbon atoms in the chain. This variable chain length is indicated by R and R' in the reaction. The reaction is then written:

$$2 \text{R'SH} + 2 \text{RSH} + \text{O}_2 \longrightarrow 2 \text{R'SSR} + 2 \text{H}_2\text{O} \qquad (2)$$

This reaction occurs spontaneously whenever any sour mercaptan-bearing distillate is exposed to atmospheric oxygen, but proceeds at a very slow rate. In addition, the catalyzed reaction (1) set forth above requires the presence of an alkali caustic solution, such as aqueous sodium hydroxide. The mercaptan oxidation proceeds at an economically practical rate at moderate refinery downstream temperatures.

The MEROX process can be conducted on both liquid streams and on combined gaseous and liquid streams. In the case of liquid streams, the mercaptans are converted directly to disulfides which remain in the product so that there is no reduction in total sulfur content of the effluent stream. The MEROX process typically utilizes a fixed bed reactor system for liquid streams and is normally employed with charge stocks having end points above 135° C.-150° C. Mercaptans are converted to disulfides in the fixed bed reactor system over a catalyst, for example, an activated charcoal impregnated with the MEROX reagent, and wetted with caustic solution. Air is injected into the hydrocarbon feedstream ahead of the reactor and in passing through the catalyst-impregnated bed, the mercaptans in the feed are oxidized to disulfides. The disulfides are substantially insoluble in the caustic and remain in the hydrocarbon phase. Post treatment is required to remove undesirable by-products resulting from known side reactions such as the neutralization of $H_2S$, the oxidation of phenolic compounds, entrained caustic, and others.

The vapor pressures of disulfides are relatively low compared to those of mercaptans, so that their presence is much less objectionable from the standpoint of odor; however, they are not environmentally acceptable due to their sulfur content and their disposal can be problematical.

In the case of mixed gas and liquid streams, extraction is applied to both phases of the hydrocarbon streams. The degree of completeness of the mercaptan extraction depends upon the solubility of the mercaptans in the alkaline solution, which is a function of the molecular weight of the individual mercaptans, the extent of the branching of the mercaptan molecules, the concentration of the caustic soda and the temperature of the system. Thereafter, the resulting DSO compounds are separated and the caustic solution is regenerated by oxidation with air in the presence of the catalyst and reused.

Referring to the attached drawings, FIG. 1 is a simplified schematic of a generalized version of a conventional MEROX process employing liquid-liquid extraction for removing sulfur compounds. A MEROX unit 1010, is provided for treating a mercaptan containing hydrocarbon stream 1001. In some embodiments, the mercaptan containing hydrocarbon stream 1001 is LPG, propane, butane, light naphtha, kerosene, jet fuel, or a mixture thereof. The process generally includes the steps of: introducing the hydrocarbon stream 1001 with a homogeneous catalyst into an extraction vessel 1005 containing a caustic solution 1002, in some embodiments, the catalyst is a homogeneous cobalt-based catalyst; passing the hydrocarbon catalyst stream in countercurrent flow through the extraction section of the extraction 1005 vessel in which the extraction section includes one or more liquid-liquid contacting extraction decks or trays (not shown) for the catalyzed reaction with the circulating caustic solution to convert the mercaptans to water-soluble alkali metal alkane thiolate compounds; withdrawing a hydrocarbon product stream 1003 that is free or substantially free of mercaptans from the extraction vessel 1005, for instance, having no more than about 1000, 100, 10 or 1 ppmw mercaptans; recovering a combined spent caustic and alkali metal alkane thiolate stream 1004 from the extraction vessel 1005; subjecting the spent caustic and alkali metal alkane thiolate stream 1004 to catalyzed wet air oxidation in a reactor 1020 into which is introduced catalyst 1005 and air 1006 to provide the regenerated spent caustic 1008 and convert the alkali metal alkane thiolate compounds to disulfide oils; and recovering a by-product stream 1007 of DSO compounds and a minor proportion of other sulfides such as mono-sulfides and tri-sulfides. The effluents of the wet air oxidation step in the MEROX process can comprise a minor proportion of sulfides and a major proportion of disulfide oils. As is known to those skilled in the art, the composition of this effluent stream depends on the effectiveness of the MEROX process, and sulfides are assumed to be carried-over material. A variety of catalysts have been developed for the commercial practice of the process. The efficiency of the MEROX process is also a function of the amount of $H_2S$ present in the stream. It is a common refinery practice to install a prewashing step for $H_2S$ removal.

An enhanced MEROX process ("E-MEROX") is a modified MEROX process where an additional step is added, in which DSO compounds are oxidized with an oxidant in the presence of a catalyst to produce a mixture of ODSO compounds. The by-product DSO compounds from the mercaptan oxidation process are oxidized, in some embodiments in the presence of a catalyst, and constitute an abundant source of ODSO compounds that are sulfoxides, sulfonates, sulfinates, sulfones and their corresponding di-sulfur mixtures. The disulfide oils having the general formula RSSR' (wherein R and R' can be the same or different and can have 1, 2, 3 and up to 10 or more carbon atoms) can be oxidized without a catalyst or in the presence of one or more catalysts to produce a mixture of ODSO compounds. The oxidant can be a liquid peroxide selected from the group consisting of alkyl hydroperoxides, aryl hydroperoxides, dialkyl peroxides, diaryl peroxides, peresters and hydrogen peroxide. The oxidant can also be a gas, including air, oxygen, ozone and oxides of nitrogen. If a catalyst is used in the oxidation of the disulfide oils having the general formula RSSR' to produce the ODSO compounds, it can be a heterogeneous or homogeneous oxidation catalyst. The oxidation catalyst can be selected from one or more heterogeneous or homogeneous catalyst comprising metals from the IUPAC Group 4-12 of the Periodic Table, including Ti, V, Mn, Co, Fe, Cr, Cu, Zn, W and Mo. The catalyst can be a homogeneous water-soluble compound that is a transition metal containing an active species selected from the group consisting of Mo (VI), W (VI), V (V), Ti (IV), and combinations thereof. In certain embodiments, suitable homogeneous catalysts include molybdenum naphthenate, sodium tungstate, molybdenum hexacarbonyl, tungsten hexacarbonyl, sodium tungstate and vanadium pentoxide. An exemplary catalyst for the controlled catalytic oxidation of MEROX process by-products DSO is sodium tungstate, $Na_2WO_4 \cdot 2H_2O$. In certain embodiments, suitable heterogeneous catalysts include Ti, V, Mn, Co, Fe, Cr, W, Mo, and combinations thereof deposited on a support such as alumina, silica-alumina, silica, natural zeolites, synthetic zeolites, and combinations comprising one or more of the above supports.

The oxidation of DSO typically is carried out in an oxidation vessel selected from one or more of a fixed-bed reactor, an ebullated bed reactor, a slurry bed reactor, a moving bed reactor, a continuous stirred tank reactor, and a tubular reactor. The ODSO compounds produced in the E-MEROX process generally comprise two phases: a water-soluble phase and water-insoluble phase, and can be separated into the aqueous phase containing water-soluble ODSO compounds and a non-aqueous phase containing water-insoluble ODSO compounds. The E-MEROX process can be tuned depending on the desired ratio of water-soluble to water-insoluble compounds presented in the product ODSO mixture. Partial oxidation of DSO compounds results in a higher relative amount of water-insoluble ODSO compounds present in the ODSO product and a near or almost complete oxidation of DSO compounds results in a higher relative amount of water-soluble ODSO present in the ODSO product. Details of the ODSO compositions are discussed in the U.S. Pat. No. 10,781,168, which is incorporated herein by reference above.

FIG. 2 is a simplified schematic of an E-MEROX process that includes E-MEROX unit 1030. The MEROX unit 1010 unit operates similarly as in FIG. 2, with similar references numbers representing similar units/feeds. In FIG. 3, the effluent stream 1007 from the generalized MEROX unit of FIG. 2 is treated. It will be understood that the processing of the mercaptan containing hydrocarbon stream of FIG. 2 is illustrative only and that separate streams of the products, and combined or separate streams of other mixed and longer chain products can be the subject of the process for the recovery and oxidation of DSO to produce ODSO compounds, that is the E-MEROX process. In order to practice the E-MEROX process, apparatus are added to recover the by-product DSO compounds from the MEROX process. In addition, a suitable reactor 1035 add into which the DSO compounds are introduced in the presence of a catalyst 1032 and an oxidant 1034 and subjecting the DSO compounds to a catalytic oxidation step to produce the mixed stream 1036 of water and ODSO compounds. A separation vessel 1040 is provided to separate the by-product 1044 from the ODSO compounds 1042.

The oxidation to produce OSDO can be carried out in a suitable oxidation reaction vessel operating at a pressure in the range from about 1-30, 1-10 or 1-3 bars. The oxidation to produce OSDO can be carried out at a temperature in the range from about 20-300, 20-150, 20-90, 45-300, 15-150 or 45-90° C. The molar feed ratio of oxidizing agent-to-mono-sulfur can be in the range of from about 1:1 to 100:1, 1:1 to 30:1 or 1:1 to 4:1. The residence time in the reaction vessel can be in the range of from about 5-180, 5-90, 5-30, 15-180, 15-90 or 5-30 minutes. In certain embodiments, oxidation of DSO is carried out in an environment without added water as a reagent. The by-products stream 1044 generally comprises wastewater when hydrogen peroxide is used as the oxidant. Alternatively, when other organic peroxides are used as the oxidant, the by-products stream 1044 generally comprises the alcohol of the peroxide used. For example, if butyl peroxide is used as the oxidant, the by-product alcohol 1044 is butanol.

In certain embodiments water-soluble ODSO compounds are passed to a fractionation zone (not shown) for recovery following their separation from the wastewater fraction. The fractionation zone can include a distillation unit. In certain embodiments, the distillation unit can be a flash distillation unit with no theoretical plates in order to obtain distillation cuts with larger overlaps with each other or, alternatively, on other embodiments, the distillation unit can be a flash distillation unit with at least 15 theoretical plates in order to have effective separation between cuts. In certain embodiments, the distillation unit can operate at atmospheric pressure and at a temperature in the range of from 100° C. to 225° C. In other embodiments, the fractionation can be carried out continuously under vacuum conditions. In those embodiments, fractionation occurs at reduced pressures and at their respective boiling temperatures. For example, at 350 mbar and 10 mbar, the temperature ranges are from 80° C. to 194° C. and 11° C. to 98° C., respectively. Following fractionation, the wastewater is sent to the wastewater pool (not shown) for conventional treatment prior to its disposal. The wastewater by-product fraction can contain a small amount of water-insoluble ODSO compounds, for example, in the range of from 1 ppmw to 10,000 ppmw. The wastewater by-product fraction can contain a small amount of water-soluble ODSO compounds, for example, in the range of from 1 ppmw to 50,000 ppmw, or 100 ppmw to 50,000 ppmw. In embodiments where alcohol is the by-product alcohol, the alcohol can be recovered and sold as a commodity product or added to fuels like gasoline. The alcohol by-product fraction can contain a small amount of water-insoluble ODSO compounds, for example, in the range of from 1 ppmw to 10,000 ppmw. The alcohol by-product fraction can contain a small amount of water-soluble ODSO compounds, for example, in the range of from 100 ppmw to 50,000 ppmw.

EXAMPLES

The below examples and data are exemplary. It is to be understood that other ratios and types of silica sources and structure directing agents can be used as compared to the examples.

Reference Example

Figures 3A, 3B:
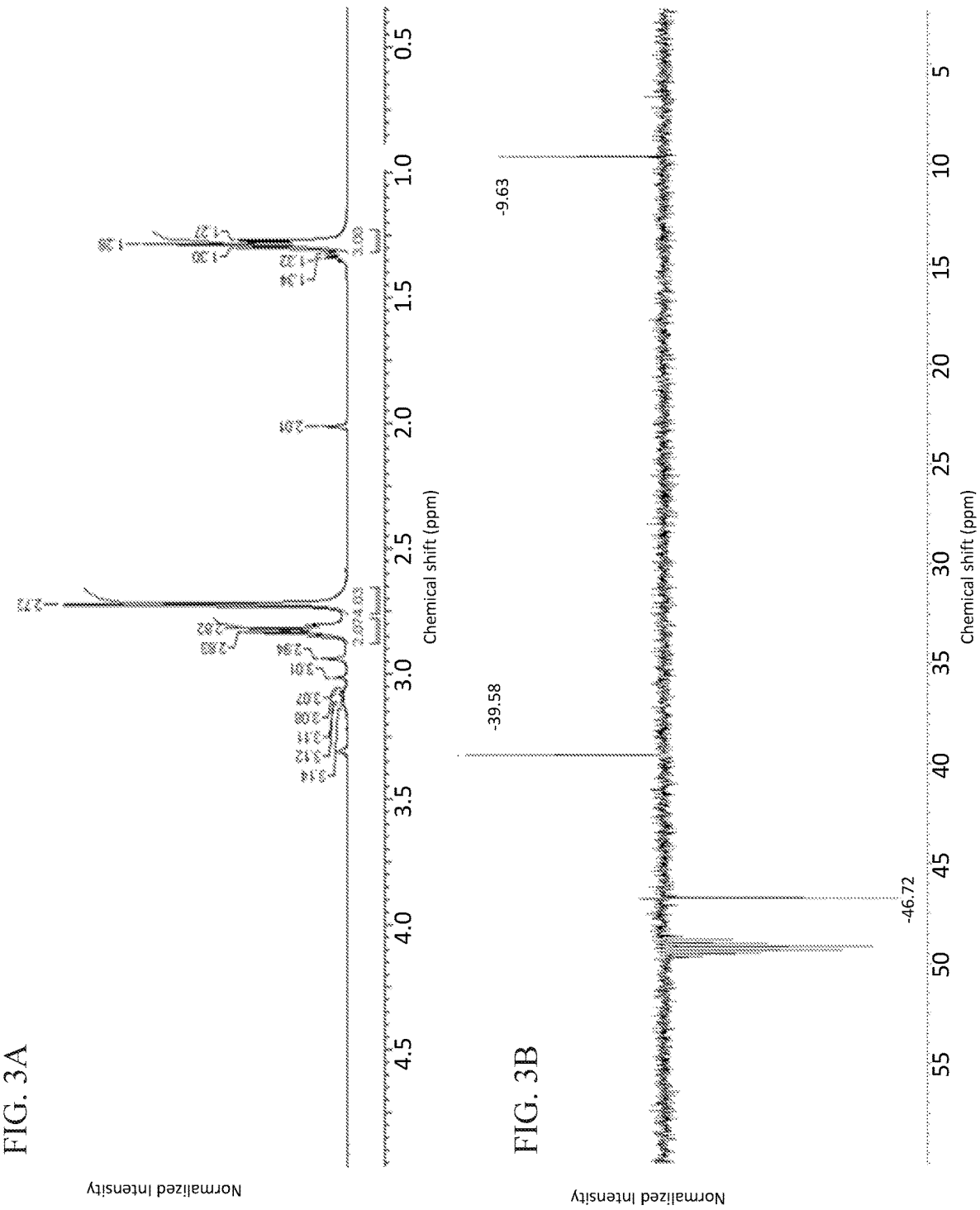
FIG. 3A is the experimental $^1$H-NMR spectrum of the polar, water-soluble ODSO fraction used in an example herein.
FIG. 3B is the experimental $^{13}$C-DEPT-135-NMR spectrum of the polar, water-soluble ODSO fraction used in an example herein.

The ODSO mixture used in the Example below was produced as disclosed in U.S. Pat. No. 10,781,168, incorporated by reference above, and in particular the fraction referred to therein as Composition 2. Catalytic oxidation a hydrocarbon refinery feedstock having 98 mass percent of C1 and C2 disulfide oils was carried out. The oxidation of the DSO compounds was performed in batch mode under reflux at atmospheric pressure, that is, approximately 1.01 bar. The hydrogen peroxide oxidant was added at room temperature, that is, approximately 23° C. and produced an exothermic reaction. The molar ratio of oxidant-to-DSO compounds (calculated based upon mono-sulfur content) was 2.90. After the addition of the oxidant was complete, the reaction vessel temperature was set to reflux at 80° C. for approximately one hour after which the water soluble ODSO was produced (referred to as Composition 2 herein and in U.S. Pat. No. 10,781,168) and isolated after the removal of water. The catalyst used in the oxidation of the DSO compounds was sodium tungstate. The Composition 2, also referred to herein as "the selected water soluble ODSO fraction," was used. FIG. 3A is the experimental $^1$H-NMR spectrum of the polar, water soluble ODSO mixture that is the selected water soluble ODSO fraction in the example herein. FIG. 3B is the experimental $^{13}$C-DEPT-135-NMR spectrum of the polar, water soluble ODSO mixture that is the selected water soluble ODSO fraction in the example herein. The selected water soluble ODSO fraction was mixed with a CD$_3$OD solvent and the spectrum was taken at 25° C. Methyl carbons have a positive intensity while methylene carbons exhibit a negative intensity. The peaks in the 48-50 ppm region belong to carbon signals of the CD$_3$OD solvent.

When comparing the experimental $^{13}$C-DEPT-135-NMR spectrum of FIG. 3B for the selected water soluble ODSO fraction with a saved database of predicted spectra, it was found that a combination of the predicted alkyl-sulfoxides-ulfonate (R—SO—SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH) most closely corresponded to the experimental spectrum. This suggests that alkyl-sulfoxides-ulfonate (R—SO—SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH) are major compounds in the selected water soluble ODSO fraction. It is clear from the NMR spectra shown in FIGS. 3A and 3B that the selected water soluble ODSO fraction comprises a mixture of ODSO compounds that form the ODSO composition used in the present examples.

Comparative Example

Precursors and reagents were used for synthesis of Silicalite-1 zeolite possessing the MFI structure as designated by the IZA in a comparative example, in the absence of ODSO (ODSO/Na-0). 10.4845 g of tetrapropylammonium hydroxide (TPAOH, 20.09 wt. %) as a structure directing agent, 4.2054 g of tetraethyl orthosilicate (TEOS, 98 wt. %) as a silica source, and 4.0368 g of distilled water (utility water) were weighed in a polytetrafluoroethylene (PTFE) liner (45 ml), and the mixture maintained under stirring for 4 hours. The PTFE liner was positioned within an autoclave and transferred to an oven and heated to a temperature of 170° C. whilst rotating the autoclave. The autoclave was maintained at isothermal conditions for 18 hours. The product was filtered and washed with distilled water before drying at 110° C. The dry mass was 0.9787 g. The XRD pattern (FIG. 4) shows the as-made product to be Silicalite-1 zeolite (MFI). The as-made product was calcined at 150° C. (2° C./min ramp rate) for 5 hours, then the temperature was increased to 550° C. (1.5° C./min ramp rate) for 8 hours to realize porous material, and the XRD pattern (FIG. 5) shows that the Silicalite-1 zeolite (MFI) structural integrity was retained after calcining.

Example 1: A quantity of the selected water soluble ODSO fraction as described in the Reference Example was added to the homogeneous aqueous mixture to replace an approximately equivalent amount of water as in the Comparative Example. In particular, the amount of ODSO relative to the total amount of utility water and ODSO is about 16.7 wt. % (i.e., the level of ODSO/"free" water substitution is about 16.7 wt. %), equivalent to about 5.4 wt. % of ODSO relative to the total amount of water and ODSO in the sol-gel, and equivalent to an ODSO/hydroxide ratio (g/g) of about 3.82 (based on hydroxide from the structure directing agent and excluding hydroxide from ethanol that is typically in situ generated from the silica source, TEOS). Ratios of other components are approximately equivalent to those in the Comparative Example.

10.4841 g of TPAOH (20.09 wt. %) as a structure directing agent, 4.2040 g of tetraethyl orthosilicate (TEOS, 98 wt. %) as a silica source, 3.364 g of distilled water (utility water), and 0.6725 g of ODSO were weighed in 45 mL PTFE liner, and the mixture maintained under stirring for 4 hours. The PTFE liner was positioned within an autoclave and transferred to an oven and heated to a temperature of 170° C. whilst rotating the autoclave. The autoclave was maintained at isothermal conditions for 18 hours. The product was filtered and washed with distilled water before drying at 110° C. The dry mass was 1.3076 g. The XRD pattern (FIG. 4) shows the as-made product to be Silicalite-1 zeolite (MFI). The as-made product was calcined at 150° C. (2° C./min ramp rate) for 5 hours, then the temperature was increased to 550° C. (1.5° C./min ramp rate) for 8 hours to realize porous material, and the XRD pattern (FIG. 5) shows that the Silicalite-1 zeolite (MFI) structural integrity was retained after calcining.

Example 2: A quantity of the selected water soluble ODSO fraction as described in the Reference Example was added to the homogeneous aqueous mixture to replace an approximately equivalent amount of water as in the Comparative Example. In particular, the amount of ODSO relative to the total amount of utility water and ODSO is about 20.0 wt. %, equivalent to about 6.5 wt. % of ODSO relative to the total amount of water and ODSO in the sol-gel, and equivalent to an ODSO/hydroxide ratio (g/g) of about 4.59 (based on hydroxide from the structure directing agent and excluding hydroxide from ethanol that is typically in situ generated from the silica source, TEOS). Ratios of other components are approximately equivalent to those in the Comparative Example.

10.4846 g of TPAOH (20.09 wt. %) as a structure directing agent, 4.2044 g of TEOS (98 wt. %) as a silica source, 3.2294 g of distilled water, and 0.8077 g of ODSO were weighed in 45 mL PTFE liner, and the mixture maintained under stirring for 4 hours. The PTFE liner was positioned within an autoclave and transferred to an oven and heated to a temperature of 170° C. whilst rotating the autoclave. The autoclave was maintained at isothermal conditions for 18 hours. The product was filtered and washed with distilled water before drying at 110° C. The dry mass was 1.3154 g. The XRD pattern (FIG. 4) shows the as-made product to be Silicalite-1 zeolite (MFI). The as-made product was calcined at 150° C. (2° C./min ramp rate) for 5 hours, then the temperature was increased to 550° C. (1.5° C./min ramp rate) for 8 hours to realize porous material, and the XRD pattern (FIG. 5) shows that the Silicalite-1 zeolite (MFI) structural integrity was retained after calcining.

Example 3: A quantity of the selected water soluble ODSO fraction as described in the Reference Example was added to the homogeneous aqueous mixture to replace an approximately equivalent amount of water as in the Comparative Example. In particular, the amount of ODSO relative to the total amount of utility water and ODSO is about 23.3 wt. %, equivalent to about 7.6 wt. % of ODSO relative to the total amount of water and ODSO in the sol-gel, and equivalent to an ODSO/hydroxide ratio (g/g) of about 5.35 (based on hydroxide from the structure directing agent and excluding hydroxide from ethanol that is typically in situ generated from the silica source, TEOS). Ratios of other components are approximately equivalent to those in the Comparative Example.

10.4860 g of TPAOH (20.09 wt. %) as a structure directing agent, 4.2058 g of TEOS (98 wt. %) as a silica source, 3.0948 g of distilled water, and 0.9415 g of ODSO were weighed in 45 mL PTFE liner, and the mixture maintained under stirring for 4 hours. The PTFE liner was positioned within an autoclave and transferred to an oven and heated to a temperature of 170° C. whilst rotating the autoclave. The autoclave was maintained at isothermal conditions for 18 hours. The product was filtered and washed with distilled water before drying at 110° C. The dry mass was 1.3009 g. The XRD pattern (FIG. 4) shows the as-made product to be Silicalite-1 zeolite (MFI). The as-made product was calcined at 150° C. (2° C./min ramp rate) for 5 hours, then the temperature was increased to 550° C. (1.5° C./min ramp rate) for 8 hours to realize porous material, and the XRD pattern (FIG. 5) shows that the Silicalite-1 zeolite (MFI) structural integrity was retained after calcining.

Example 4: A quantity of the selected water soluble ODSO fraction as described in the Reference Example was added to the homogeneous aqueous mixture to replace an approximately equivalent amount of water as in the Comparative Example. In particular, the amount of ODSO relative to the total amount of utility water and ODSO is about 26.7 wt. %, equivalent to about 8.7 wt. % of ODSO relative to the total amount of water and ODSO in the sol-gel, and equivalent to an ODSO/hydroxide ratio (g/g) of about 6.11 (based on hydroxide from the structure directing agent and excluding hydroxide from ethanol that is typically in situ generated from the silica source, TEOS). Ratios of other components are approximately equivalent to those in the Comparative Example.

10.4850 g of TPAOH (20.09 wt. %) as a structure directing agent, 4.2049 g of TEOS (98 wt. %) as a silica source, 2.9600 g of distilled water, and 1.0760 g of ODSO were weighed in 45 mL PTFE liner, and the mixture maintained under stirring for 4 hours. The PTFE liner was positioned within an autoclave and transferred to an oven and heated to a temperature of 170° C. whilst rotating the autoclave. The autoclave was maintained at isothermal conditions for 18 hours. The product was filtered and washed with distilled water before drying at 110° C. The dry mass was 1.1962 g. The XRD pattern (FIG. 4) shows the as-made product to be Silicalite-1 zeolite (MFI). The as-made product was calcined at 150° C. (2° C./min ramp rate) for 5 hours, then the temperature was increased to 550° C. (1.5° C./min ramp rate) for 8 hours to realize porous material, and the XRD pattern (FIG. 5) shows that the Silicalite-1 zeolite (MFI) structural integrity was retained after calcining.

Example 5: A quantity of the selected water soluble ODSO fraction as described in the Reference Example was added to the homogeneous aqueous mixture to replace an approximately equivalent amount of water as in the Comparative Example. In particular, the amount of ODSO relative to the total amount of utility water and ODSO is about 30.1 wt. %, equivalent to about 9.8 wt. % of ODSO relative to the total amount of water and ODSO in the sol-gel, and equivalent to an ODSO/hydroxide ratio (g/g) of about 6.90 (based on hydroxide from the structure directing agent and excluding hydroxide from ethanol that is typically in situ generated from the silica source, TEOS). Ratios of other components are approximately equivalent to those in the Comparative Example.

10.4845 g of TPAOH (20.09 wt. %) as a structure directing agent, 4.2045 g of TEOS (98 wt. %) as a silica source, 2.8258 g of distilled water, and 1.2146 g of ODSO were weighed in 45 mL PTFE liner, and the mixture maintained under stirring for 4 hours. The PTFE liner was positioned within an autoclave and transferred to an oven and heated to a temperature of 170° C. whilst rotating the autoclave. The autoclave was maintained at isothermal conditions for 18 hours. The product was filtered and washed with distilled water before drying at 110° C. The dry mass was 1.0540 g. The XRD pattern (FIG. 4) shows the as-made product to be Silicalite-1 zeolite (MFI). The as-made product was calcined at 150° C. (2° C./min ramp rate) for 5 hours, then the temperature was increased to 550° C. (1.5° C./min ramp rate) for 8 hours to realize porous material, and the XRD pattern (FIG. 5) shows that the Silicalite-1 zeolite (MFI) structural integrity was retained after calcining.

Example 6: A quantity of the selected water soluble ODSO fraction as described in the Reference Example was added to the homogeneous aqueous mixture to replace an approximately equivalent amount of water as in the Comparative Example. In particular, the amount of ODSO relative to the total amount of utility water and ODSO is about 33.3 wt. %, equivalent to about 10.8 wt. % of ODSO relative to the total amount of water and ODSO in the sol-gel, and equivalent to an ODSO/hydroxide ratio (g/g) of about 7.65 (based on hydroxide from the structure directing agent and excluding hydroxide from ethanol that is typically in situ generated from the silica source, TEOS). Ratios of other components are approximately equivalent to those in the Comparative Example.

10.4850 g of TPAOH (20.09 wt. %) as a structure directing agent, 4.2049 g of TEOS (98 wt. %) as a silica source, 2.6912 g of distilled water, and 1.3466 g of ODSO were weighed in 45 mL PTFE liner, and the mixture maintained under stirring for 4 hours. The PTFE liner was positioned within an autoclave and transferred to an oven and heated to a temperature of 170° C. whilst rotating the autoclave. The autoclave was maintained at isothermal conditions for 18 hours. The product was filtered and washed with distilled water before drying at 110° C. The dry mass was 1.1347 g. The XRD pattern (FIG. 4) shows the as-made product to be amorphous silica.

Figure 4:
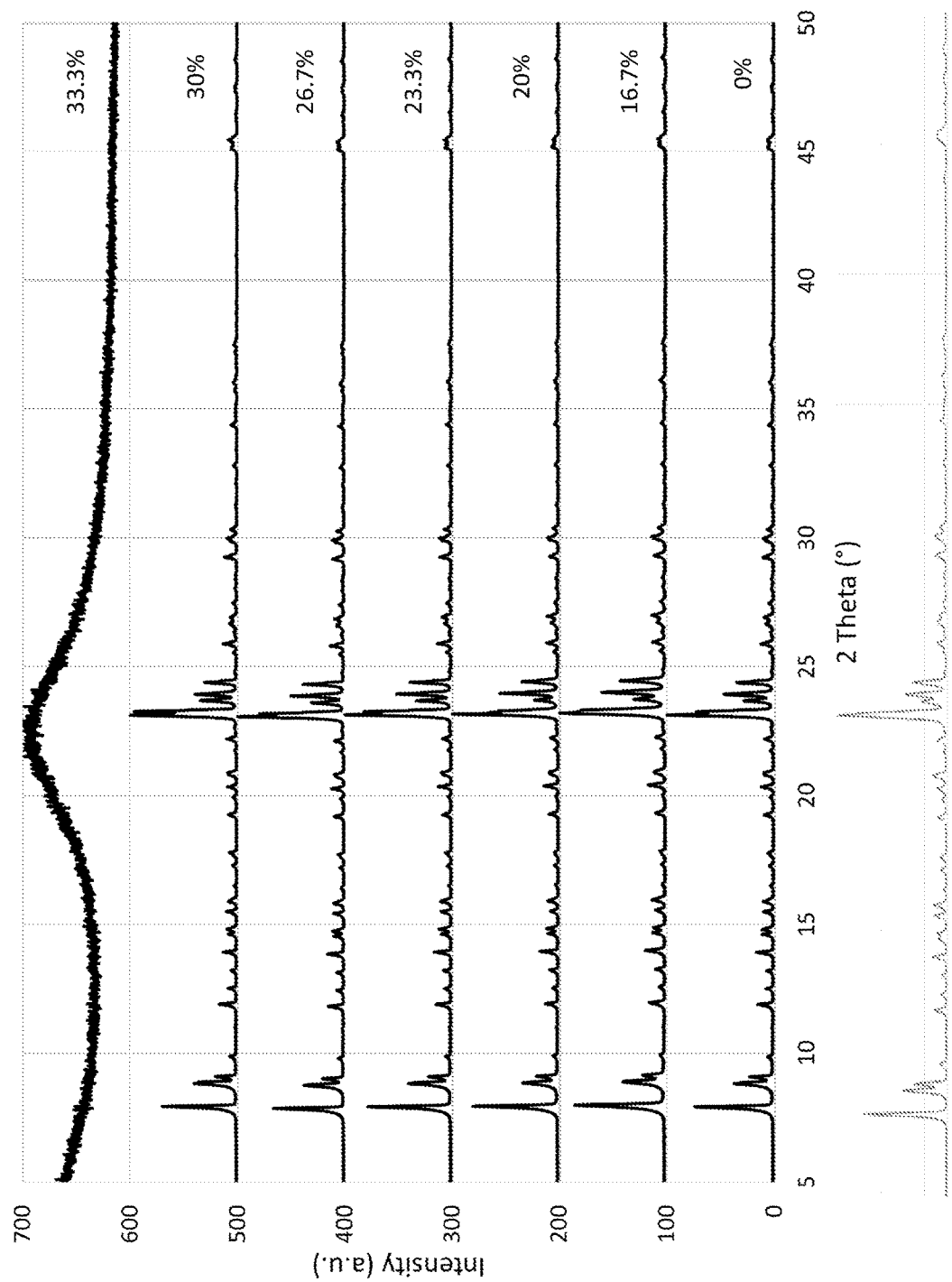
FIG. 4 shows X-ray diffraction (XRD) patterns of the as-made products from the examples.
Figure 5:
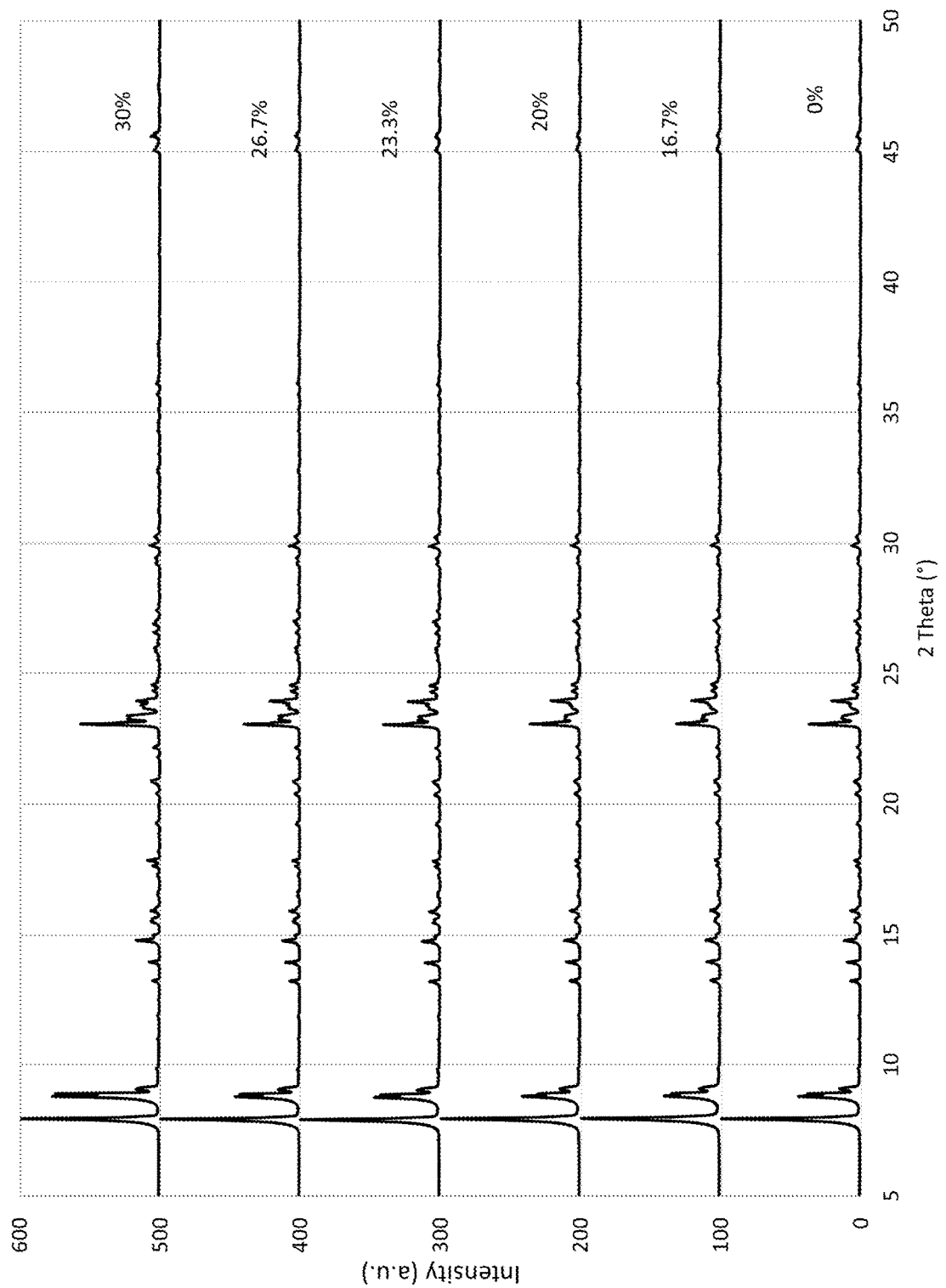
FIG. 5 shows XRD patterns of the calcined products from certain examples.
Figure 6:
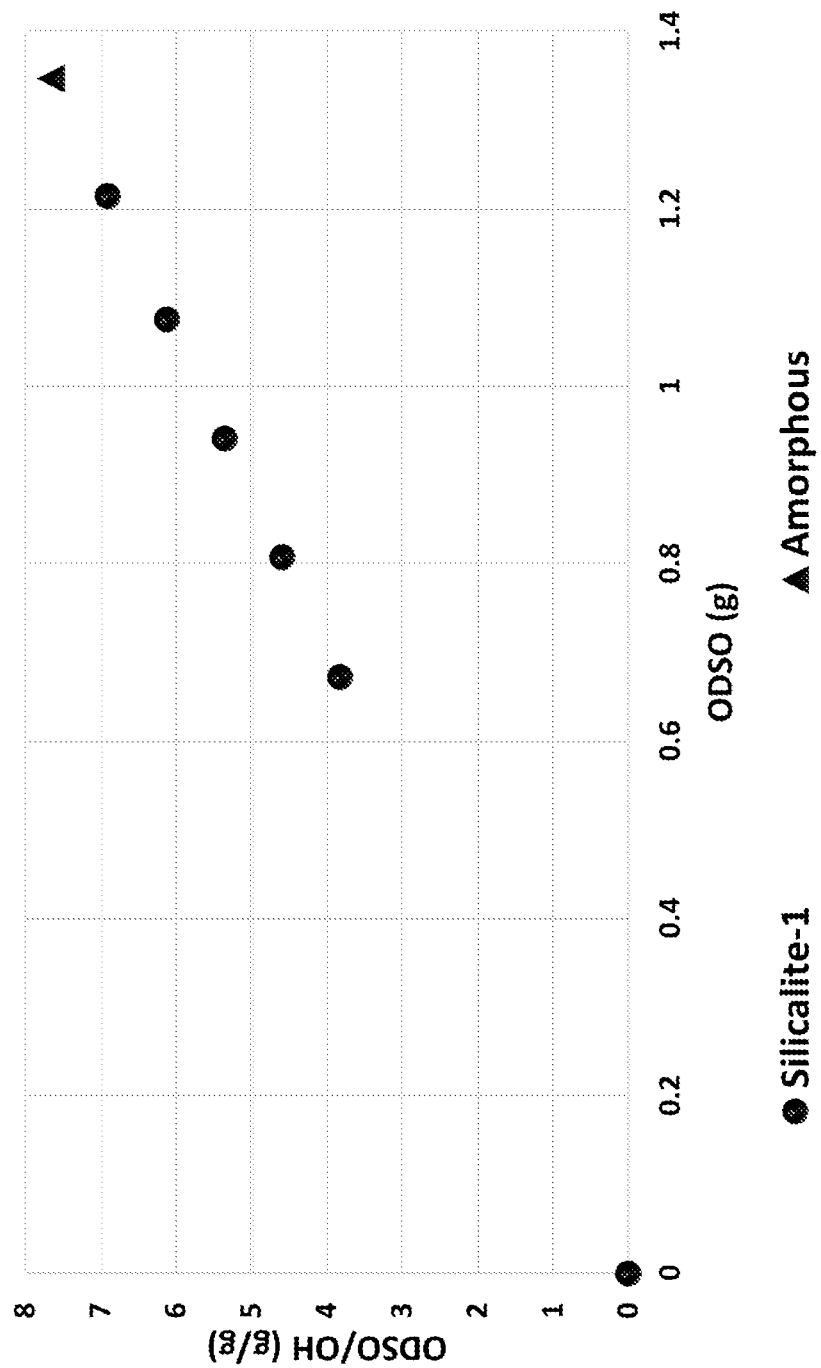
FIG. 6 is a graph of product phase as a function of ODSO content.

FIG. 4 shows XRD patterns of the as-made Comparative Example and Examples 1-6, where each pattern is offset on the y-axis by an equivalent amount for clarity, and where the XRD powder patterns are normalized to the highest intensity peak. The bottom pattern is an XRD pattern for Silicalite-1 zeolite from the IZA. The patterns are shown as a function of the amount of ODSO relative to the total mass of utility water and ODSO [ODSO (g)/(ODSO (g)+utility water (g))] expressed as a mass percent. FIG. 5 shows XRD patterns of the calcined Comparative Example and Examples 1-5, where each pattern is offset on the y-axis by an equivalent amount for clarity, and where the XRD powder patterns are normalized to the highest intensity peak. It is apparent that structural integrity is retained after calcination for all samples. Table 2 shows the normalized yield of Silicalite-1 zeolite as a function of ODSO addition. FIG. 6 is a graph of ODSO/hydroxide ratio (g/g) and quantity of ODSO, showing transition between crystalline products and amorphous products as a function of the ODSO/hydroxide ratio.

Note that the three-letter codes used throughout herein correspond to the framework types established by the International Zeolite Association (IZA), unless otherwise designated.

As used herein, "approximately equivalent" as concerning the amount of ODSO that replaces water, the cumulative amount of ODSO and water, the component molar or mass ratios, and/or the hydrolysis conditions and time, is within a margin of less than or equal to plus or minus 1, 2, 5 or 10% of the compared value.

It is to be understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

TABLE 1

| ODSO Name | Formula | Structure Examples |
|---|---|---|
| Dialkyl-sulfonesulfoxide Or 1,2-alkyl-alkyl-disulfane 1,1,2-trioxide | (R—SOO—SO—R') | 1,2-Dimethyldisulfane 1,1,2-trioxide |
| Dialkyl-disulfone Or 1,2 alkyl-alkyl-disulfane 1,1,2,2-tetraoxide | (R—SOO—SOO—R') | 1,2-Dimethyldisulfane 1,1,2,2-tetraoxide |
| Alkyl-sulfoxidesulfonate | (R—SO—SOO—OH) | Methylsulfanesulfonic acid oxide |
| Alkyl-sulfonesulfonate | (R—SOO—SOO—OH) | 1-Hydroxy-2-methyldisulfane 1,1,2,2-tetraoxide |
| Alkyl-sulfoxidesulfinate | (R—SO—SO—OH) | 1-Hydroxy-2-methyldisulfane 1,2-dioxide |
| Alkyl-sulfonesulfinate | (R—SOO—SO—OH) | Methylsulfanesulfinic acid dioxide |

R and R' can be the same or different alkyl or aryl groups comprising 1-10 carbon atoms.

TABLE 2

| 100*[ODSO (g) / (ODSO (g) + utility water (g))] | Normalized Yield |
|---|---|
| 0 | 1.00 |
| 16.7 | 1.34 |
| 20.0 | 1.34 |
| 23.3 | 1.33 |
| 26.7 | 1.22 |
| 30.1 | 1.08 |
| 33.3 | N/A (amorphous) |

The invention claimed is:

1. A method for synthesis of pure silica zeolite comprising:
   forming a homogeneous aqueous mixture of an effective amount of water-soluble oxidized disulfide oil (ODSO), and precursors and reagents effective for synthesis of pure silica zeolite; and
   heating the homogeneous aqueous mixture under conditions and for a time effective to form a precipitate suspended in a supernatant, wherein the precipitate comprises pure silica zeolite.

2. The method of claim 1, wherein the precursors and reagents effective for synthesis of pure silica zeolite comprise a silica source, a hydroxide source, and one or both of a structure directing agent or a seed material.

3. The method as in claim 1, wherein the pure silica zeolite possesses a framework corresponding to one of those selected from the group consisting of AFI, AST, ATS, BEA, BEC, CFI, CHA, DDR, DOH, DON, EUO, FER, GON, IFR, IHW, ISV, ITE, ITH, ITW, IWR, LTA, MEL, MFI, MTF, MTN, MTT, MTW, MWW, NON, RRO, RTE, RUT, RWR, SAS, SGT, SOD, STO, STF, STT and TON, as defined by the International Zeolite Association.

4. The method as in claim 1, wherein the pure silica zeolite is Silicalite-1 possessing an MFI structure as designated by the International Zeolite Association.

5. The method of claim 1, wherein the precipitate is calcined at an effective temperature, temperature ramp rate and for an effective period of time to realize porous pure silica zeolite.

6. The method as in claim 4, wherein the precursors and reagents effective for synthesis of pure silica zeolite comprises a silica source and a structure directing agent source, wherein the structure directing agent source comprises structure directing agent cations and hydroxide anions associated with the structure directing agent cations as the hydroxide source, and a mass ratio of ODSO to hydroxide anions associated with the structure directing agent cations is in the range of about 0.01-7.3.

7. The method as in claim 4, wherein a total amount of water for the homogeneous aqueous mixture comprises utility water, water from a water-containing silica source, and water from a water-containing structure directing agent, and the effective amount of ODSO relative to a sum of the total amount of water and the effective amount of ODSO is between about 0.01-10.3 mass %.

8. The method as in claim 4:
wherein the precursors and reagents effective for synthesis of pure silica zeolite comprises a water-containing silica source, a water-containing structure directing agent;
wherein a total amount of water for the homogeneous aqueous mixture includes utility water, water from the water-containing silica source and water from the water-containing structure directing agent; and
wherein the effective amount of ODSO relative to a sum of the amount of utility water and the effective amount of ODSO is between about 0.01-31.7 mass %.

9. The method as in claim 2, wherein
a cumulative amount of ODSO and water is within a margin of less than or equal to plus or minus 10% of an amount of water that is effective to produce pure silica zeolite in the absence of ODSO;
the cumulative amount of ODSO and water, an amount of the silica source, and an amount of one or both of a structure directing agent and a seed material are provided at an ODSO-enhanced compositional ratio;
the ODSO-enhanced compositional ratio is within a margin of less than or equal to plus or minus 10% of a baseline compositional ratio of water, silica source, and one or both of the structure directing agent and the seed material, the baseline compositional ratio being effective to produce pure silica zeolite in the absence of ODSO; and
the conditions and time of heating are within a margin of less than or equal to plus or minus 10% of to those that are effective to produce pure silica zeolite absence of ODSO.

10. The method as in any claim 1, wherein the precursors and reagents effective for synthesis of pure silica zeolite comprises a silica source selected from the group consisting of sodium silicate (water glass), rice husk, fumed silica, precipitated silica, colloidal silica, silica gels, zeolites, dealuminated zeolites, silicon hydroxides and silicon alkoxides.

11. The method as in claim 1, wherein the precursors and reagents effective for synthesis of pure silica zeolite comprises a structure directing agent to stabilize the structure of the pure silica zeolite.

12. The method as in claim 11, wherein the structure directing agent comprises a cationic constituent selected from the group consisting of secondary or tertiary amines, quaternary ammonium ions, azamacrocycle derived templates, spiro templates, diazabicyclo derived templates, pyridinium, pyrrolium, azanium, diazabicyclooctane, pyrrolidinium, piperidinium, piperazinium, imidazolium, quinolinium, quinuclidinium, hexamethyleneimine, sparteinium and cobaltcenium.

13. The method as in claim 11, wherein the structure directing agent comprises a quaternary ammonium ions.

14. The method as in claim 11, wherein the structure directing comprises tetrapropylammonium hydroxide.

15. The method as in claim 2, wherein the precursors and reagents effective for synthesis of pure silica zeolite comprises a silica source and a seed material, optionally in the absence of a structure directing agent.

16. The method as in claim 1:
wherein the homogeneous aqueous mixture is (optionally) aged before being subjected to heating for a period of about 0-48 hours;
wherein the homogeneous aqueous mixture is heated at a temperature in the range of about 65-200° C.;
wherein the homogeneous aqueous mixture is heated at autogenous pressure or a pressure in the range of atmospheric to 17 bar; and
wherein the homogeneous aqueous mixture is heated for a time period within the range of about 0.1-8 days.

17. The method as in claim 1, wherein the ODSO is derived from oxidation of disulfide oil compounds present in an effluent refinery hydrocarbon stream recovered following catalytic oxidation of mercaptans present in a mercaptan-containing hydrocarbon stream.

18. The method as in claim 1, wherein the ODSO comprises ODSO compounds having 3 or more oxygen atoms and 1 to 20 carbon atoms, and are contained in a mixture having an average density greater than about 1.0 g/cc and an average boiling point greater than about 80° C.

19. The method as in claim 1, wherein the ODSO comprises ODSO compounds have 3 or more oxygen atoms and include:
one or more compounds selected from the group consisting of (R—SOO—SO—R'), (R—SOO—SOO—R'), (R—SO—SOO—OH), (R—SOO—SOO—OH), (R—SOO—SO—OH), (R—SO—SO—OR'), (R—SOO—SO—OR'), (R—SO—SOO—OR') and (R—SOO—SOO—OR'), wherein R and R' are the same or different C1-C10 alkyl or C6-C10 aryl;
two or more compounds selected from the group consisting of (R—SOO—SO—R'), (R—SOO—SOO—R'), (R—SO—SOO—OH), (R—SOO—SOO—OH), (R—SOO—SO—OH), wherein R and R' are the same or different C1-C10 alkyl or C6-C10 aryl;
one or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), wherein R and R' are same or different C1-C10 alkyl or C6-C10 aryl; or
two or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), wherein R and R' are same or different C1-C10 alkyl or C6-C10 aryl.

20. The method as in claim 1, wherein the ODSO comprises ODSO compounds contained in a pH-modified water-soluble ODSO composition comprising an aqueous mixture of one or more water-soluble ODSO compounds and an effective amount of an alkaline agent, or wherein the ODSO comprises ODSO compounds contained in a supernatant from a prior synthesis that utilized water-soluble ODSO as a component.

* * * * *